(12) United States Patent
Homsma et al.

(10) Patent No.: US 8,563,069 B2
(45) Date of Patent: Oct. 22, 2013

(54) CITRUS PULP FIBER DRY BLEND SYSTEMS

(75) Inventors: Catharina Hillagonda Homsma, Bertem (BE); Jennifer Kenney, Suwanee, GA (US); Brian Surratt, Tucker, GA (US); Jozef Guido Roza Vanhemelrijck, Meise (BE); Patrick Veillard, Brussels (BE); Joël Rene Pierre Wallecan, Brussels (BE)

(73) Assignee: Cargill, Incorporated, Wayzata, MN (US)

( * ) Notice: Subject to any disclaimer, the term of this patent is extended or adjusted under 35 U.S.C. 154(b) by 128 days.

(21) Appl. No.: 12/747,822

(22) PCT Filed: Dec. 11, 2008

(86) PCT No.: PCT/US2008/013579
§ 371 (c)(1),
(2), (4) Date: Sep. 30, 2010

(87) PCT Pub. No.: WO2009/075851
PCT Pub. Date: Jun. 18, 2009

(65) Prior Publication Data
US 2011/0020525 A1    Jan. 27, 2011

Related U.S. Application Data

(60) Provisional application No. 60/996,927, filed on Dec. 11, 2007.

(51) Int. Cl.
*A23L 1/0522* (2006.01)

(52) U.S. Cl.
USPC ........... 426/615; 426/573; 426/578; 426/590; 426/601

(58) Field of Classification Search
USPC .......................... 426/615, 573, 601, 590, 578
See application file for complete search history.

(56) References Cited

U.S. PATENT DOCUMENTS

| | | | |
|---|---|---|---|
| 4,413,017 A | 11/1983 | Loader | |
| 4,623,549 A | 11/1986 | Katt et al. | |
| 4,774,099 A * | 9/1988 | Feeney et al. | 426/552 |
| 4,865,863 A * | 9/1989 | Prosise et al. | 426/518 |
| 5,185,176 A | 2/1993 | Chiu | |
| 5,458,904 A | 10/1995 | Zolper | |

(Continued)

FOREIGN PATENT DOCUMENTS

| | | |
|---|---|---|
| DE | 19943188 A1 | 3/2001 |
| EP | 0485030 A | 5/1992 |

(Continued)

OTHER PUBLICATIONS

Larrea M A et al, "Some functional properties of extruded orange pulp and its effect on the quality of cookies", Lebensmittel Wissenschaft Und Technologies, May 1, 2005, pp. 213-220, vol. 38, No. 3, Academic Press, London, GB.

(Continued)

*Primary Examiner* — Helen F Heggestad

(57) ABSTRACT

There is disclosed a dry blend system comprising citrus pulp fiber; and at least one component selected from the group consisting of hydrocolloids, lipids, carbohydrates, and proteins, wherein the dry blend system is capable of replacing the solids content in a finished food product.

12 Claims, 15 Drawing Sheets

(56) References Cited

U.S. PATENT DOCUMENTS

| | | | |
|---|---|---|---|
| 5,725,899 | A | 3/1998 | Cole et al. |
| 6,503,545 | B1 | 1/2003 | Perlman et al. |
| 2004/0258801 | A1 | 12/2004 | Ling et al. |
| 2005/0271790 | A1 | 12/2005 | Aronson et al. |
| 2006/0251789 | A1* | 11/2006 | Lundberg et al. ............ 426/565 |
| 2006/0280840 | A1 | 12/2006 | Robertson |
| 2010/0196519 | A1* | 8/2010 | Vanhemelrijck et al. ..... 424/736 |

FOREIGN PATENT DOCUMENTS

| | | |
|---|---|---|
| EP | 1692948 | 8/2006 |
| EP | 1723856 A1 | 11/2006 |
| EP | 2230946 | 9/2010 |
| JP | 62036149 A | 2/1987 |
| RU | 2156594 C1 | 9/2000 |
| RU | 2277354 C2 | 6/2006 |
| WO | WO 01/17376 A1 | 3/2001 |
| WO | WO 02/15720 | 5/2002 |
| WO | 2006/033697 | 3/2006 |
| WO | WO 2006/122734 | 11/2006 |
| WO | 2007/003391 | 1/2007 |
| WO | 2008/062057 * | 5/2008 |
| WO | WO 2008/062057 A | 5/2008 |
| WO | WO 2010/093864 A3 | 11/2010 |

OTHER PUBLICATIONS

Grigelmo-Miguel et al., "Characterization of Dietary Fiber From Orange Juice Extraction", Food Research International, vol. 31, No. 5, pp. 191-204.

Fisher, J., "Functional Properties of Herbacel AQ Plus Fruit Fibers"; Poster presented at Dietary Fibre 2000, Dublin, May 13-18, 2000, 2 pages.

Yoshida et al., "Citrus Juice Waste as a Potential Source of Dietary Fiber", J. Japan Soc. Hort. Sci., vol. 53, No. 3, pp. 354-361, 1984.

International Search Report from corresponding PCT/US08/13579, mailed Feb. 26, 2009, 1 page.

U.S. Appl. No. 13/201,386, filed Aug. 12, 2011, Alexandre et al.

Fisher, J., "Fruit Fibres to Improve the Nutition", XP002608042, Innovations in Food Technology, 2007, pp. 4.

Kerry Hughes, "Reduce Fat with Pulp Fiber", XP008137836, Prepared Food Networks, [Online], retrieved from: http://www.preparedfoods.com/articles/reduce-fat-with-pulp-fiber, Jan. 1, 2007, pp. 2.

PCT International Search Report PCT/US2010/024015 mailed Sep. 21, 2010. 3 pages.

PCT International Search Report PCT/EP2006/006442 mailed Jul. 9, 2006. 2 pages.

Gengiz E et al., "Changes in energy and cholesterol contents of frankfurter-type sausages with fat reduction and fat replacer addition", Food Chemistry, Jul. 1, 2005, vol. 91, No. 3, pp. 443-447, Elsevier Ltd, NL.

Larrea M A et al., "Some functional properties of extruded orange pulp and its effect on the quality of cookies", Lebensmittel Wissenschaft Und Technologies, May 1, 2005, pp. 213-220, vol. 38, No. 3, Academic Press, London, GB.

Souci et al., "Food Compositions and Nutrition Tables" 2000, Medpharm, Stuttgart, XP002395859, pp. 47, 1037.

Grigelmo-Miguel et al., "Characterization of Dietary Fiber From Orange Juice Extraction", Food Research International, vol. 31, No. 5, pp. 191-204, Jun. 1998.

Porzio et al. Washed Orange Pulp; Characterization and Properties; ACS Symposium Series, Apr. 11, 1983, pp. 191-204.

* cited by examiner

CITRUS PULP FIBER DRY BLEND SYSTEMS

CROSS REFERENCE TO RELATED APPLICATION

This application claims the benefit of U.S. provisional application Ser. No. 60/996,927, filed 11 Dec. 2007.

DESCRIPTION OF THE DISCLOSURE

1. Field of the Disclosure

The disclosure relates to dry blend systems and food systems comprising citrus pulp fiber, and methods of use thereof in foods and beverages.

2. Background of the Disclosure

Food manufacturers are continuously challenged to find ways to improve various qualities in food systems, such as improving shelf life, improving flavor, reducing calories, replacing commonly known food allergens, and keeping raw material production costs low. To attain these objectives, food manufacturers often endeavor to find substitutes to traditional materials, which can impart these qualities in a better or more efficient manner and/or provide the same qualities at a reduced cost. At the same time, however, the appetizing and authentic nature of the food systems should be sustained. Additionally, food manufacturers are also continuously searching for ways to produce naturally-sourced food systems to satisfy increasing consumer demand for healthy and natural foods. Thus, there is a continuing need to develop food systems that can achieve these desirable objectives.

It is also well-known that current processes for making fruit juice, such as citrus fruit juice, employ extractors for separating the juice-containing inner part of the fruit (often referred to as coarse pulp, juice pulp, floating pulp, juice sacs, or pulp fibers) from its outer peel. These processes produce certain waste fruit materials, such as pulp fibers and peels. For many years, problems with the disposal of waste fruit material have prompted attempts to utilize this waste material. For example, numerous attempts have been made to employ pulp fibers in foods intended for human and/or pet consumption. Accordingly, in light of the objectives discussed above, it is desirable to explore the use of waste fruit materials, such as citrus pulp fiber, to develop food systems which can achieve the desirable characteristics discussed above.

SUMMARY OF THE DISCLOSURE

In an aspect, there is disclosed a dry blend composition comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber, and at least one component selected from the group consisting of hydrocolloids, lipids, carbohydrates, dairy proteins, and egg proteins.

Moreover, in an aspect, there is disclosed a wet system comprising a dry blend system comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber and at least one component selected from the group consisting of hydrocolloids, lipids, carbohydrates, dairy proteins, and egg proteins; and a liquid system, wherein the liquid system is selected from the group consisting of water, water miscible liquids, water immiscible liquids, and microemulsions Moreover, in a further aspect, there is disclosed a method of emulsifying a food system, said method comprising providing a dry blend system comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber, and at least one component selected from the group consisting of hydrocolloids, lipids, carbohydrates, dairy proteins, and egg proteins; mixing said dry blend system with a liquid system to generate an emulsion, wherein the liquid system is selected from the group consisting of water, water miscible liquids, water immiscible liquids, and microemulsions; and wherein said emulsion is devoid of synthetic and natural emulsifiers.

Furthermore, in an aspect, there is disclosed a method of minimizing phase separation in emulsions, said method comprising providing a dry blend system comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber, and at least one component selected from the group consisting of hydrocolloids, lipids, carbohydrates, dairy proteins, and egg proteins; and mixing said dry blend system with a liquid system to generate an emulsion, wherein the liquid system is selected from the group consisting of water, water miscible liquids, water immiscible liquids, and microemulsions; and wherein said emulsion is devoid of synthetic and natural emulsifiers.

Moreover, in another aspect, there is disclosed a method of providing high shear tolerance to a food system, said method comprising providing a dry blend system comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber, and at least one component selected from the group consisting of hydrocolloids, lipids, carbohydrates, dairy proteins, and egg proteins; and mixing said dry blend system with a liquid system to generate a food system, wherein the liquid system is selected from the group consisting of water, water miscible liquids, water immiscible liquids, and microemulsions; and wherein the food system demonstrates high shear tolerance as compared to a food system devoid of gelatins.

In yet another aspect, there is disclosed a method of providing thermal stability to a food system during heat treatment, said method comprising providing a dry blend system comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber, and at least one component selected from the group consisting of hydrocolloids, lipids, carbohydrates, dairy proteins, and egg proteins; and mixing said dry blend system with a liquid system to generate a food system, wherein the liquid system is selected from the group consisting of water, water miscible liquids, water immiscible liquids, and microemulsions; and wherein the food system demonstrates improved thermal stability during heat treatment as compared to a food system devoid of citrus pulp fiber.

In a further aspect, there is disclosed a method of controlling syneresis in a food system, said method comprising providing a dry blend system comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber, and at least one component selected from the group consisting of hydrocolloids, carbohydrates, dairy proteins, and egg proteins; and mixing said dry blend system with a liquid system to generate a food system, wherein the liquid system is selected from the group consisting of water, water miscible liquids, water immiscible liquids, and microemulsions; and wherein said food system demonstrates reduced syneresis as compared to a food system devoid of citrus pulp fiber.

DESCRIPTION OF THE EMBODIMENTS

Figure 1:
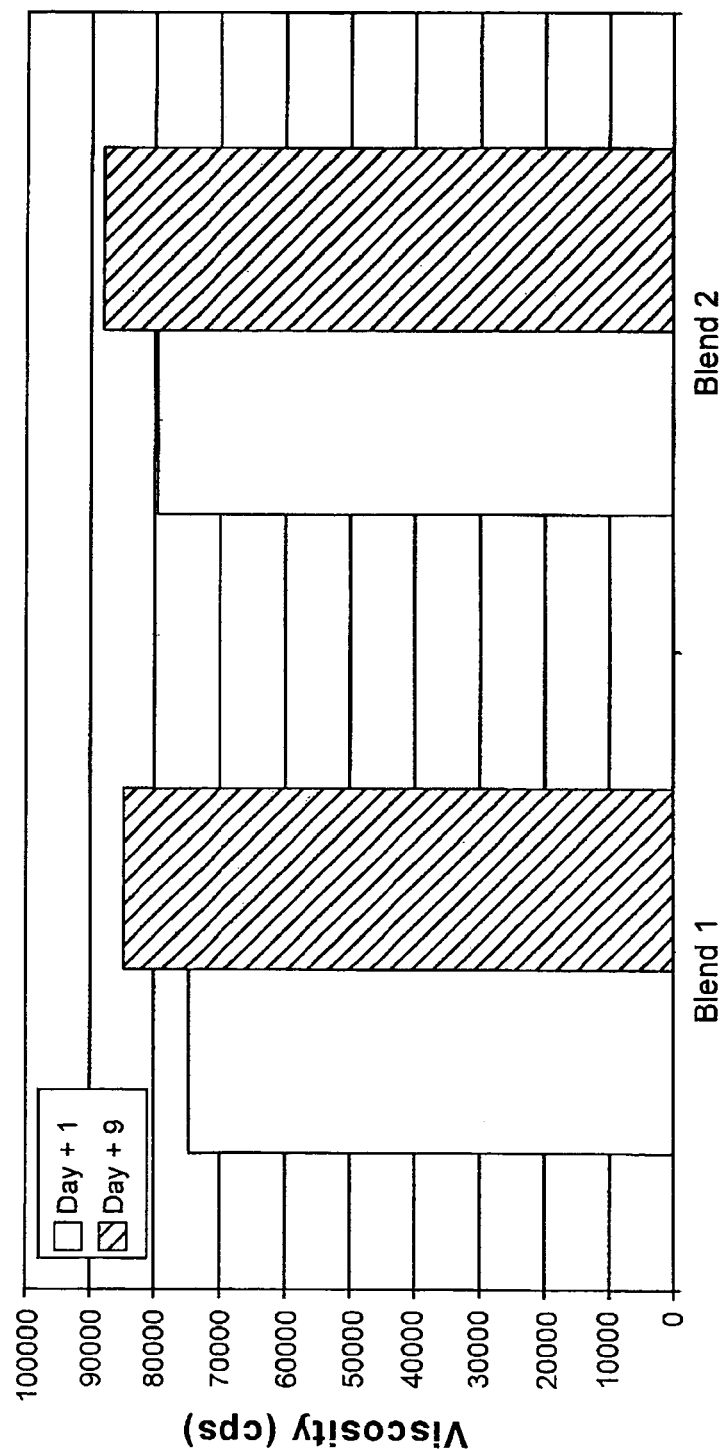
FIG. 1 is a graph comparing viscosities in sour cream systems.

The present disclosure relates to a dry blend system comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber; and at least one component selected from the group consisting of hydrocolloids, starches, dairy proteins, and egg proteins, and methods of use thereof in foods and beverages.

As used herein, the term "dry blend system" is understood to mean a system comprising about 90 to 100% dry ingredients (e.g., particulates, powders and the like) and 0 to about 10% moisture.

As used herein, the term "food system" is understood to mean systems comprising food products and beverages intended for human and/or pet consumption. A food system can comprise a mixture of all the ingredients of a particular food product prior to the processing steps which results in the finished food product.

As used herein, the term "citrus pulp fiber" and its grammatical derivatives is understood to mean fiber derived from the juice-containing inner part of citrus fruits, which is often referred to as coarse pulp, juice pulp, floating pulp, juice sacs, or pulp fibers. Citrus pulp fiber suitable for use herein can be derived from any citrus fruit including, but not limited to, oranges, tangerines, limes, lemons, grapefruits, and mixtures thereof. In an aspect, the citrus pulp fiber can be derived from orange fruit of any variety, for example Valencia oranges, Early/Mid-Season oranges, blood oranges, or mandarin oranges.

As used herein, the term "Valencia orange" or "Valencia orange fruit" refers to orange fruit from the genotype or variety Valencia, which usually mature relatively late in the harvest season as compared with other citrus fruit, e.g., orange fruit generally maturing during the months of March through June. Examples of Valencia orange fruit include, but are not limited to, Florida Valencia orange fruit, California Valencia orange fruit, and Brazilian Valencia orange fruit. As used herein, the term "Early/Mid-Season orange" or "Early/Mid-Season orange fruit" ("E/M") refers to orange fruit which usually mature during the early to middle part of the harvest season, e.g., orange fruit generally maturing during the months of October through February. Examples of Early/Mid-Season orange fruit include, but are not limited to, Florida Early/Mid-Season oranges (such as the Hamlin, Parson, Brown, and Pineapple varieties), Brazilian Early/Mid-Season orange fruit (such as the Pera Rio and Natal varieties), and California Early/Mid-Season orange fruit (such as the California Navel variety).

As used herein, the term "replace" and its grammatical variations is understood to mean using the disclosed dry blend system comprising citrus pulp fiber to replace all or some solids (e.g., lipids, proteins, and/or carbohydrates) in a food system, where citrus pulp fiber performs the functional roles of said replaced solids. Without being limited by theory, it is thought that the functionality for each and/or all of the replaced solids in a food system is mimicked by the dry blend system comprising citrus pulp fiber. The disclosed dry blend system is thought to provide similar and consistent organoleptic properties in a food system, where such properties are traditionally supplied by the replaced solids. In this way, the disclosed dry blend system can restore the functional requirements (often in a lesser amount compared to the replaced solids) in a food system, due to the unique properties (e.g., water binding capacity and oil binding capacity) linked with the disclosed dry blend system. Similarly, the ability of the disclosed dry blend system to mimic functionalities allows manufacturers to reduce costs and/or offer cleaner ingredient declarations to those same manufacturers.

As used herein, the term "devoid" and its grammatical variations is understood to mean containing at most trace amounts of a substance (e.g., less than 0.5 wt. %)

Citrus pulp fibers suitable for use herein can be extracted by any known process, providing that they exhibit a water binding capacity of from about 7 g of water to about 25 g of water per gram of citrus pulp fiber, and an oil binding capacity of from about 1.5 g of oil to about 10 g of oil per gram of citrus pulp fiber. The water binding capacity of the citrus pulp fibers can be measured by preparing samples in double and averaging the results to arrive at the final result, according to the following procedure: 0.5 g of the fiber (dry powder) can be placed into a 50 mL centrifuge tube and weighed (noted as W1). Then 40 g of milli-Q water (noted as W2) can be added. The tube can then be closed and stirred by hand for one minute. The tube can be submitted to centrifugation for five minutes at 2000 rpm, and the supernatant can then be decanted and weighed (noted as W3). The water binding capacity (WBC) of the fibers can be calculated by the following formula: WBC=(W2−W3)/W1. The WBC is expressed as grams of water per gram of fiber (g water/g fiber).

The oil binding capacity of the citrus pulp fibers can be measured by centrifuging 5% powder dispersion and weighing the precipitate. Samples can be prepared and measured according to the following procedure: 2.5 g of powdered fiber (noted as W1) can be dispersed in 50 g of standard quality soya oil (noted as W2) in a 300 mL beaker. The samples can be stirred for 10 minutes at about 500 rpm until the fibers are completely dispersed. The samples can be left for 30 minutes until they are adapted to the hydrophobicity. The samples can be stirred again after adapting, and 45 g of the sample can be transferred to a centrifuge tube. The weight of the tube can be noted as W3, and the total weight of the centrifuge tube with the sample can be noted as W4. The tubes containing the sample can be centrifuged for five minutes at 3800 rpm, the supernatants decanted, and the centrifuged tubes containing the precipitated weighed (noted as W5).

The oil binding capacity (OBC) of the fibers can be calculated by the following formula: $OBC=W_{co}/W_{cp}$, where $W_{cp}$ can be calculated as $W_{cp}=(W_p/100)\times(W4-W3)$, and $W_{co}$ can be calculated as $W_{co}=W5-W3-W_{cp}$. $W_p$ (percent of product in sample dispersion) can be calculated as $W_p=W1\times100/(W1+W2)$. $W_o$ (percent of oil in sample dispersion) can be calculated as $W_o=W2\times100/(W1+W2)$. The OBC is expressed as grams of oil per gram of fiber (g oil/g fiber).

In an embodiment, citrus pulp fiber can be extracted by the processes described in WO 2006/033697, the disclosure of which is hereby incorporated by reference in its entirety.

Properties of the Disclosed Dry Blend System

The disclosed dry blend system can be formed by any mixing method, with the proviso that the mixture is not co-processed. For instance, the dry blend system components are not subjected to treatment during mixing. As a non-limiting example, the disclosed dry blend system can be formed by mixing citrus pulp fiber with at least one component selected from the group consisting of hydrocolloids, starches, dairy proteins, and egg proteins, in an industrial mixer or blender.

The disclosed dry blend system comprising citrus pulp fiber can demonstrate a number of advantageous properties including, but not limited to, the ability to replace traditional texturizers in food systems, such as emulsifiers and gelatins, etc. For example, food emulsifiers have long been used in processed foods containing fats and oils to stabilize water and oil emulsions. Water and oil emulsions can be broadly categorized into two types: oil-in-water (o/w) emulsions, such as milk, ice cream, and mayonnaise, where oil is the dispersed phase and water the continuous phase; or water-in-oil (w/o) emulsions, such as margarine and butter, where water is the dispersed phase and oil the continuous phase.

Emulsions are not thermodynamically stable and can break down in a variety of ways. The particles can recombine or coalesce (breaking and coalescence), ultimately returning to the original two immiscible phases. In other situations, the emulsion can undergo phase inversion, whereby the oil and water change places so that an o/w emulsion becomes a w/o emulsion. Another form of emulsion instability happens where the particles retain their identities but become non-uniformly distributed in the container. This can happen either by flocculation, where particles cluster together and form clumps, or by creaming, where the density difference between the particles and the continuous phase causes gravitational separation. Whatever the mechanism, emulsion instability can disturb and damage a food system.

Emulsifiers reduce surface tension between the two immiscible phases due to their molecular structure. Emulsifiers have both a polar group with an affinity for water (hydrophilic) and a non-polar group with an affinity for oil (lipophilic). The presence of both regions on an emulsifier molecule allows it to orient itself at the phase interface and lower the interfacial energy that leads to emulsion instability. Generally, traditional, synthetic food emulsifiers can be partial esters of fatty acid and polyols, and/or water soluble organic acids. Non-limiting examples of traditional food emulsifiers include propylene glycol esters of fatty acids, polyglycerol esters of fatty acids, polysorbates, mono- and diglycerides (MDG), lecithin, and sodium stearoyl lactylate. Hydrocolloids and protein, such as gelatin, egg proteins, and dairy proteins, can also be used as emulsifiers.

However, at least one disadvantage of using traditional, synthetic emulsifiers arises due to governmental food regulations and/or religious practice limitations which ban specific additives in certain food systems. For example, sodium stearoyl lactylate is not permitted in dairy creamer food systems under Canadian regulations. As another example, gelatins are not permitted in food systems under kosher food practices. As a further example, xanthan gum, guar gum, and carboxymethyl cellulose are not permitted in juice systems under Mexican regulations. Thus, a material which functions like an emulsifier but does not encounter these types of limitations can be widely useful as an emulsifier substitute, thereby allowing market penetration into various culturally and regulatory food restrictive market segments. Moreover, such an emulsifier substitute material which is sourced from natural materials can be used to produce naturally-sourced food systems to satisfy increasing consumer demand for healthy and natural foods.

In an aspect, the disclosed dry blend system can possess similar functional characteristics as a dry blend system comprising traditional, synthetic and natural emulsifiers. For example, and as discussed below, the disclosed dry blend system can effectively replace all of a dry blend system comprising traditional, synthetic and natural emulsifiers in a wide variety of food systems including, but not limited to, fruit application systems, frozen dessert systems, process cheese systems, coffee creamer systems, cottage cheese dressing systems, sour dressing systems, sour cream systems, convenience systems, meat systems, and the like. Without intending to be limited by theory, it is believed that citrus pulp fibers possess both hydrophilic and lipophilic regions and can thereby act as emulsifiers. Accordingly, the disclosed dry blend system comprising citrus pulp fiber (which is sourced from natural materials) can be used to produce naturally sourced food systems to satisfy increasing consumer demand for healthy and natural foods. In an embodiment, citrus pulp fibers can bind from about 1.5 to about 4 grams of oil, such as from about 2.8 to about 3.6 grams of oil, per gram of citrus pulp fiber.

In another aspect, a dry blend system comprising citrus pulp fiber and at least one lipid, wherein the lipid is an emulsifier (e.g. lecithin), can also synergistically improve the emulsion functionality discussed above. As used herein, the term "synergy" and its grammatical variations refer to the interaction of elements that, when combined, produce a total effect greater than the sum of the individual elements. Without intending to be limited by theory, it is believed that the presence of hydrophilic and lipophilic regions on citrus pulp fibers contributes to competition at the phase interface between the citrus pulp fiber and emulsifier, thereby producing a functionality greater than that predicted by the separate effects of the individual agents. This synergistic effect is discussed further below.

In yet another aspect, the disclosed dry blend system can also display increased functionality with respect to viscosity and suspension properties in a wide variety of food systems including, but not limited to, fruit application systems, frozen dessert systems, process cheese systems, coffee creamer systems, cottage cheese dressing systems, sour dressing systems, sour cream systems, beverage systems, convenience systems, and meat systems. For instance, the disclosed dry blend system can provide thickening properties, assist in suspending or dispersing other materials in a composition, and the like. As an example, and as described below, a dry blend system comprising citrus pulp fiber and at least one hydrocolloid can synergistically improve the viscosity and suspension functional characteristics described above.

Hydrocolloids are hydrophilic colloidal materials that readily absorb water, thus increasing viscosity and imparting smoothness and body texture to food products. Depending on the quantity of water available, hydrocolloids can exist in different states, e.g., gel or sol (liquid). Thus, hydrocolloids can also be agents which, when present in low amounts can act as emulsifiers or stabilizers, and when present in high amounts can act as thickeners or solidifying agents. Without intending to be limited by theory, it is believed that the presence of hydrophilic regions on citrus pulp fibers contributes to competition between the citrus pulp fiber and hydrocolloid to absorb water, thereby producing a functionality greater than that predicted by the separate effects of the individual agents. This synergistic effect is discussed further below.

In a further aspect, the disclosed dry blend system can also replace solids content in food systems including, but not limited to, fruit application systems, frozen dessert systems, process cheese systems, coffee creamer systems, cottage cheese dressing systems, sour dressing systems, sour cream systems, beverage systems, convenience systems, meat systems, and the like. For example, and as discussed below, the disclosed dry blend system can effectively replace all or some of the fat, protein, and carbohydrate solids present in food systems, which are otherwise necessary to retain desired organoleptic properties, finished product performance, and consumer acceptability. Without intending to be limited by theory, it is believed that citrus pulp fiber can function as an emulsifier, thus providing emulsification functionality in place of that previously provided by some or all of the fats, proteins, and/or carbohydrates present in a food system. As used herein, the term "solids content" is understood to mean food solids, which are not water, that are present in a food system.

For instance, various agents, such as hydrocolloids, lipids, carbohydrates, and proteins, are included in food systems to provide a multitude of desirable properties, such as stability, emulsification, shear tolerance, acid tolerance, water absorption, thickening, acidulation, suspension, and the like. However, by decreasing or eliminating the amount of certain agents used (e.g., emulsifiers, fats, proteins, etc.) the disclosed dry blend systems can reduce the solids content present in food systems, or replace certain solids in food systems.

As another non-limiting example, frozen dessert systems, such as ice cream systems, can use multiple synthetic emulsifiers (e.g., propylene glycol monoester, polysorbates, monoglycerides, diglycerides, and mixtures thereof) to produce a single finished product. By using the disclosed dry blend system instead of a traditional dry blend system including synthetic emulsifiers, a frozen dessert system can even be produced that has a reduced solids content because less solids are used to produce said product. Accordingly, the disclosed dry blend system can lower the solids content in a food system, and provide an avenue for manufacturers to reduce raw material production costs.

Components of the Dry Blend System

In an aspect, the disclosed dry blend system can comprise dairy or egg proteins. The dairy proteins can be derived from cream, whole milk, buttermilk, skim milk, nonfat dry milk solids, whey, whey protein concentrate, whey protein isolate, and mixtures thereof. Non-limiting examples of suitable milk proteins include, but are not limited to, caseinates, such as sodium caseinate, calcium caseinate, and paracaseinate (rennet casein); and whey proteins, such as beta-lactoglobulin and alpha-lactalbumin. The egg proteins can be derived from any avian egg, including but not limited to chickens, ducks, and geese. Non-limiting examples of suitable egg proteins include, but are not limited to liquid egg white proteins, liquid egg yolk proteins, and egg protein powders.

The dry blend system of the present disclosure can comprise dairy and egg proteins in varying amounts, depending on the needs of the relevant application. The proteins can provide a variety of functions including, but not limited to, texturizing, emulsifying, and providing nutritional value.

The disclosed dry blend system can also replace the amount of dairy and egg protein solids used in a food system. In an embodiment, the disclosed dry blend system can be advantageously used to effectively replace all or some of a dry blend system comprising caseinates and/or traditional, synthetic emulsifiers. As a non-limiting example, the disclosed dry blend system can advantageously be incorporated into a food system, such as a coffee creamer (coffee whitener) system, to provide excellent stability and emulsification, without the use of caseinates or with a reduced amount of caseinates.

Coffee creamer systems which maintain a stable emulsion with a reduced amount of caseinates or traditional, synthetic emulsifiers (e.g., where all or some of the caseinate solids or traditional, synthetic emulsifier solids are reduced) can be desirable for market segments directed to: people with dairy allergies, specifically casein allergies; people with culturally and regulatory restrictive food requirements; and people seeking naturally-sourced food systems. Moreover, the stabilization of coffee creamer systems is necessary for desirable shelf-life performance, organoleptic and finished product performance, and consumer acceptability. As a non-limiting example, the disclosed dry blend system can provide thermal stability to coffee creamer systems during excessive heat treatments, such as pasteurization. This can provide such systems with the ability to use butterfat rather than vegetable fat and retain the capacity to be used in long shelf life applications, such as those employing ultra high temperature (UHT) processing, aseptic processing, high temperature-short time (HTST) processing, and mixtures thereof.

In another embodiment, the disclosed dry blend system can be advantageously used in place of a dry blend system comprising gelatins. As a non-limiting example, the disclosed dry blend system can advantageously be incorporated into a food system, such as a sour dressing (imitation sour cream) system, to provide high shear tolerance in said food system (e.g., when physical forces are applied through industrial processing), without the use of gelatins and without compromising the structural integrity of said food system.

Gelatin, a connective tissue protein, is derived from animal sources. Therefore, providing a food system which can demonstrate high shear tolerance without gelatins can be desirable for market segments directed to people with culturally and regulatory restrictive food requirements.

As previously discussed herein, the disclosed dry blend system can be useful as an emulsifier substitute, and can thus be used as substitutes for emulsifiers such as caseinates, and the like. Accordingly, the disclosed dry blend system can replace all or some of the proteins, such as dairy or egg proteins, used in various food systems, thereby reducing the solids content present therein. In this way, it is possible to reduce the raw material costs of producing a food system, which often can be driven by the cost of proteins used, without compromising desirable shelf life performance, organoleptic and finished product performance, and consumer acceptability.

The disclosed dry blend system can also comprise a hydrocolloid. Any hydrocolloid can be used in the presently disclosed dry blend system. As used herein, "hydrocolloid" is understood to mean any hydrophilic colloidal material, which absorbs water, thus increasing viscosity. A hydrocolloid can impart smoothness and body texture to food systems. Suitable hydrocolloids include, but are not limited to, plant-derived gums, such as plant exudates, plant seed gums, plant cereal grains, mannan gums, pectins, and seaweed extracts; fermentation gums; animal products; and mixtures thereof. As an example, hydrocolloids used in hydrocolloid confectionery can include agar, alginates, xanthan gum, gellan gum, carob bean gum, gum arabic, pectin, gelatin, carrageenan, konjac gum, starch derivatives, and mixtures thereof.

As another example, hydrocolloids that can form thermoreversible gels or contribute to the formation of thermoreversible gels can be useful. Such hydrocolloids include, but are not limited to, kappa-carrageenan, iota-caragenenan, xanthan gum, gellan gum, and mannan gums (such as locust bean gum (LBG), konjac gum, tara gum, and cassia gum.) As used herein, "contribute to the formation of thermoreversible gels" is understood to mean gums that may not form thermoreversible gels individually but can form thermoreversible gels when combined with another hydrocolloid, such as carageenan. As a further example, gums that do not form thermoreversible gels can also be useful hydrocolloids. Such hydrocolloids include dextrins (such as maltodextrin), proteins, gum arabic, and polyvinylpyrrolidone.

The dry blend system of the present disclosure can comprise hydrocolloids in varying amounts, depending on the needs of the relevant application. In an aspect, the hydrocolloids can also function as emulsifiers.

In an embodiment, the disclosed dry blend system can demonstrate synergy with hydrocolloids, such that the combined total effect in a food system is greater than the sum of the effect of the hydrocolloid alone or the dry blend system devoid of hydrocolloid in a food system. For example, a dry blend system comprising citrus pulp fiber and at least one hydrocolloid can be used in a food system, wherein the citrus pulp fiber and hydrocolloid synergistically act to improve functionality including, but not limited to, emulsion stability, reduced syneresis, increased oil binding capacity, and the like. Non-limiting examples of food systems in which the disclosed dry blend system can demonstrate synergy with hydrocolloids include, but are not limited to, fruit application systems, frozen dessert systems, process cheese systems, coffee creamer systems, icing application systems, cottage cheese dressing systems, sour dressing systems, sour cream systems, beverage systems, convenience systems, meat systems, and the like.

Synergy with hydrocolloids, such as pectin and agar, can be seen in Example 8 below, for example. In Example 8, fruit compote systems comprising citrus pulp fiber and pectin demonstrated significantly less syneresis as compared to fruit compote systems without citrus pulp fiber or pectin. Moreover, as can be seen in Example 5, icing application systems comprising citrus pulp fiber and agar were more viscous than icing application systems comprising citrus pulp fiber or agar alone.

Furthermore, as can be seen in Example 7, process cheese applications comprising citrus pulp fiber, xanthan gum, and locust bean gum (LBG) demonstrated a 10-fold increase in gel strength as compared to process cheese applications comprising starch and/or gums alone.

In situations where hydrocolloids also act as emulsifiers, the disclosed dry blend system can be useful as a hydrocolloid (emulsifier) substitute, without compromising desirable properties. Thus, the disclosed dry blend system can be used as substitutes for all or some of such hydrocolloids. Accordingly, the disclosed dry blend system can replace all or some of the hydrocolloid solids used in various food systems, thereby reducing the solids content present therein. In this way, it is possible to reduce the raw material costs of producing a food system, without compromising desirable shelf life performance, organoleptic and finished product performance, and consumer acceptability.

As a non-limiting example, consider an ice cream system. A step that can affect the quality of the finished ice cream product is the "aging" step, which occurs after the raw materials have been emulsified together. During aging of the ice cream mix, the interfacial surface composition can be controlled or modified using citrus pulp fiber, similar to the effect created by traditional, synthetic emulsifying agents. The less control of the interfacial surface composition, the greater the loss of desirable organoleptic properties in the finished ice cream product. (e.g., formation of uncontrolled ice crystal size, fat agglomeration, and/or air cell size results in a less desirable finished ice cream product.) Thus, selecting an effective emulsifier to keep the aged mix stable before aeration and freezing is an important decision.

As seen in Example 3, ice cream systems comprising the disclosed dry blend system can maintain acceptable emulsion viscosities (an indicator of interfacial surface composition control) as compared to an ice cream system devoid of the dry blend system. However, the disclosed dry blend system utilizes a reduced amount of hydrocolloid.

The disclosed dry blend system can also comprise a carbohydrate. Any carbohydrate can be used in the present disclosure. Suitable examples of carbohydrates include, but are not limited to, monosaccharides, disaccharides, oligosaccharides, polysaccharides, sugar alcohols, and mixtures thereof. For instance, useful monosaccharides can include tetroses, such as erythrose; pentoses, such as arabinose, xylose, and ribose; hexoses, such as glucose (dextrose), fructose, galactose, mannose, sorbose, and tagatose; and the like. As another example, useful disaccharides can include sucrose, maltose, trehalulose, melibiose, kojibiose, sophorose, laminaribiose, isomaltose, gentiobiose, cellobiose, mannobiose, lactose, leucrose, maltulose, turnanose, and the like.

As a further example, useful polysaccharides include digestible, partially digestible, and nondigestible polysaccharides. Non-limiting examples of useful digestible polysaccharides include glycogen; starches that are derived from rice, corn, maize, barley, soybeans, sunflower, canola, wheat, oats, rye, potato, and cassava; maltodextrin obtained by the partial hydrolysis of starch; and mixtures thereof. Suitable types of starches can be native, unmodified starches; pregelatinized starches; chemically modified starches; high amylase starches; waxy starches; mixtures thereof; and the like.

Useful nondigestible polysaccharides can be water-soluble or water-insoluble. Non-limiting examples of water-soluble and predominately water-soluble, nondigestible polysaccharides include oat bran, barley bran; psyllium; pentosans; plant extracts such as pectins, inulin, and beta-glucan soluble fiber; seed galactomannans such as guar gum and locust bean gum; plant exudates such as gum arabic, gum tragacanth, and gum karaya; seaweed extracts such as agar, carrageenans, alginates, and furcellaran; cellulose derivatives such as methylcellulose, carboxymethyl cellulose, and hydroxypropyl methylcellulose; microbial gums such as xanthan gum and gellan gum; hemicellulose; polydextrose; and mixtures thereof.

Non-limiting examples of suitable water-insoluble and predominantly water-insoluble nondigestible polysaccharides include cellulose, microcrystalline cellulose, brans, resistant starch, and mixtures thereof. The dry blend system of the present disclosure can comprise carbohydrates in varying amounts, depending on the needs of the relevant application.

In an embodiment, the disclosed dry blend system can demonstrate synergy with carbohydrates, such that the combined total effect in a food system is greater than the sum of the effect of the carbohydrate alone or the dry blend system devoid of carbohydrate in a food system. For example, a dry blend system comprising citrus pulp fiber and at least one carbohydrate can be used in a food system, wherein the citrus pulp fiber and carbohydrate synergistically act to improve functionality including, but not limited to, emulsion stability, reduced syneresis, increased oil binding capacity, and the like. Non-limiting examples of food systems in which the disclosed dry blend system can demonstrate synergy with carbohydrates include, but are not limited to, fruit application systems, frozen dessert systems, process cheese systems, coffee creamer systems, icing application systems, cottage cheese dressing systems, sour dressing systems, sour cream systems, beverage systems, convenience systems, meat systems, and the like. In an embodiment, the citrus pulp fiber can synergistically act with carbohydrates, such as an n-octenyl succinate (nOSA) starch, to improve functionality.

In situations where carbohydrates also act as emulsifiers, the disclosed dry blend system can be useful as a carbohydrate (emulsifier) substitute, without compromising desirable properties. Thus, in an aspect, the disclosed dry blend system can be used as substitutes for dry blend systems comprising such carbohydrates including, but not limited to carboxy methylcellulose, sodium stearoyl lactylate, mono- and diglycerides, and mixtures thereof. Accordingly, the disclosed dry blend system can replace all or some of the carbohydrate solids used in various food systems, thereby reducing the solids content present therein.

As a non-limiting example, consider an ice cream system again. As discussed above, selecting an effective emulsifier which can keep the interfacial surface composition controlled or modified is an important decision. As demonstrated in Example 3, ice cream systems comprising the disclosed dry blend system can maintain acceptable emulsion viscosities (an indicator of interfacial surface composition control) as compared to an ice cream system devoid of the dry blend system. However, the disclosed dry blend system does not utilize sodium stearoyl lactylate (SSL), mono- and diglycerides (MDG), polysorbates, propylene glycol monoesters (PGME), and mixtures thereof.

As another non-limiting example, consider a beverage application system. The disclosed dry blend system can be used as a substitute for carboxymethyl cellulose in beverage blends. Accordingly, in an aspect, the disclosed dry blend systems can be used to replace all or some pulp and/or fruit solids, since the citrus pulp fiber can provide textures similar to carboxymethyl cellulose. In this way, the disclosed dry blend system can replace all or some of the carbohydrate solids used in food systems, such as beverage application systems, and reduce the solids content present in said system.

In another aspect, the disclosed dry blend system can impart improved suspension properties in pulp based beverages. Without intending to be limited by theory, it is believed that citrus pulp fiber acts synergistically with high-methoxyl (HM) pectin to provide increased suspension functionality. For instance, as demonstrated in Example 10 below, pulp-based beverages comprising citrus pulp fiber and HM pectin demonstrated reduced phase separation and increased pulp suspension, as compared to beverages comprising HM pectin alone.

The disclosed dry blend system can also comprise a lipid. Any lipid can be used in the present disclosure. Suitable lipids include, but are not limited to, vegetable oils and fats, lauric oils and fats, milk fat, animal fats, marine oils, partially digestible and nondigestible oils and fats, surface-active lipids, and mixtures thereof. Useful vegetable oils and fats include, but are not limited to, triacylglycerols based on $C_{18}$ unsaturated fatty acids, such as oleic acids, linoleic acids, and mixtures thereof. Non-limiting examples of useful unhydrogenated, partially hydrogenated, and fully hydrogenated vegetable oils include oils derived from soybeans, safflowers, olives, corn, maize, cotton seeds, palm, peanuts, flaxseeds, sunflowers, rice bran, sesame, rapeseed, cocoa butter, and mixtures thereof.

Useful lauric oils and fats include, but are not limited to, triacylglycerols based on lauric acid comprising 12 carbon atoms. Non-limiting examples of useful laruic oils and fats include coconut oil, palm kernel oil, babassu oil, and mixtures thereof.

Non-limiting examples of useful animal fats include lard, beef tallow, egg lipids, intrinsic fat in muscle tissue, and mixtures thereof.

Non-limiting examples of useful marine oils include triacylglycerols based on $\Omega$-3 polyunsaturated fatty acids, such as docosahexanoic acid, menhaden oil, herring oil, and mixtures thereof.

Partially digestible and nondigestible oils and fats can be useful in certain applications because they impart little or no calories to a food system and can impart a hypocholesterolemic capability to foods that incorporate said fats and oils. Non-limiting examples of such fats and oils include polyol fatty acid polyesters, structured triglycerides, plant sterols and sterol esters, other nondigestible lipids such as esterified propoxylated glycerin (EPG), and mixtures thereof. Examples of useful plant sterols and esters include but are not limited to sitosterol, sitostanol, campesterol, and mixtures thereof. Examples of partially digestible and nondigestible oils and fats that can provide food systems with a hypocholesterolemic capability include but are not limited to sucrose polyesters, such as those sold under the trade name of Olean® by the Procter & Gamble Company of Cincinnati, Ohio.

In situations where lipids also act as emulsifiers, the disclosed dry blend system can be useful as a lipid (emulsifier) substitute, without compromising desirable properties. Thus, in an aspect, the disclosed dry blend system can be used as substitutes for a dry blend system comprising such lipids including, but not limited to, lecithin, polysorbate, partially hydrogenated oils, and mixtures thereof. Accordingly, the disclosed dry blend system can replace all or some of the lipid solids used in various food systems, thereby reducing the solids content present therein.

In an aspect, the disclosed dry blend system can also demonstrate synergy with lipids such as lecithin, such that the combined total effect in a food system is greater than the sum of the effect of the lipid alone or the dry blend system devoid of the lipid in a food system. For example, a dry blend system comprising citrus pulp fiber and at least one lipid can be used in a food system such as an ice cream system, wherein the citrus pulp fiber and lipid synergistically act to improve functionality including, but not limited to, emulsion stability, increased oil binding capacity, and the like. In an embodiment, the disclosed dry blend system can act as an emulsifier and can comprise a mixture of citrus pulp fiber and lecithin.

In another embodiment, the disclosed dry blend system can be mixed with a liquid system to form a wet system. The liquid system can be water, water miscible liquids, water immiscible liquids, and microemulsions. As used herein, "microemulsions" is understood to mean a dispersion of two immiscible liquids (one liquid phase "dispersed" and the other being "continuous") in which the individual droplets of the dispersed phase have an average radius of less than about ¼ of the wavelength of light, for example less than about 1,400 Å.

Non-limiting examples of water miscible liquids include milk; milk protein containing liquids, such as cream, buttermilk, whey, and yogurt; ice cream; soy milk based liquid; alcohol containing liquid; and mixtures thereof. Non-limiting examples of water immiscible liquids include hydrophobic, lipid-based liquids, such as vegetable oil, olive oil, safflower oil, peanut oil, sesame oil, corn oil, canola oil, flaxseed oil, sunflower oil, soybean oil, rapeseed oil, mineral oil, oils derived from rice bran and cocoa butter, and mixtures thereof. In an aspect, the microemulsion can comprise oil and water. In another aspect, the wet system can further comprise at least one additive selected from the group consisting of electrolytes, trace elements, fats, flavoring agents, antioxidants, edible acids, vitamins, minerals, buffering salts, colorants, preservatives, emulsifiers, sweeteners, and mixtures thereof.

Other Ingredients

Optionally, the disclosed dry blend system can further comprise one or more additives to improve the flavor, color, texture, appearance, nutrition and/or other properties of the dry blend system. Non-limiting examples of such additives include, but are not limited to, electrolytes, trace elements, flavoring agents, antioxidants, edible acids, vitamins, minerals, buffering salts, colorants, preservatives, emulsifiers, sweeteners, and mixtures thereof. When used in any embodiment, such additives are added in effective amounts.

As used herein, the term "edible acid" is understood to mean any water soluble acid material having a $pK_a$ of less than about 5 and is safe for ingestion by humans. Examples of edible acids include, but are not limited to, citric acid, ascorbic acid, malic acid, succinic acid, adipic acid, gluconic acid, tartaric acid, fumaric acid, phosphoric acid, mono-potassium phosphate, and mixtures thereof.

Examples of suitable electrolytes include, but are not limited to, sodium, potassium, chloride, calcium, magnesium, and mixtures thereof. In an embodiment, trace elements can be included, such as chromium, copper, selenium, iron, manganese, molybdenum, zinc, and mixtures thereof.

Non-limiting examples of suitable flavoring agents include natural and synthetically prepared flavoring agents, non-caloric sweeteners, bracers, and flavanols. As used herein, the term "flavoring agent" encompasses seasonings and spices. Any natural or synthetic flavoring agent can be used in the present disclosure, such as sweet flavors, fruit flavors, natural botanical flavors, savory flavors, and mixtures thereof. Savory flavors include, but are not limited to, grain-based flavors, spice-based flavors, and buttery-type flavors. Sweet flavors include, but are not limited to, chocolate, praline, and caramel. Non-limiting fruit flavors include apple, citrus, grape, raspberry, cranberry, cherry, and the like. These fruit flavors can be derived from natural sources such as fruit juices and flavor oils, or else be synthetically prepared. Non-limiting natural botanical flavors include aloe vera, ginseng, gingko, hawthorn, hibiscus, rose hips, chamomile, peppermint, fennel, ginger, licorice, lotus seed, schizandra, saw palmetto, sarsaparilla, safflower, St. John's Wort, curcuma, cardamom, nutmeg, cassia bark, buchu, cinnamon, jasmine, haw, chrysanthemum, water chestnut, sugar cane, lychee, bamboo shoots, and the like. The flavoring agents can be available as concentrates, extracts, or in the form of synthetically produced flavoring esters, alcohols, aldehydes, terpenes, sesquiterpenes, and the like.

The dry blend system of the present disclosure can be prepared by any manner known to those skilled in the art. For example, the ingredients of the dry blend system can be physically mixed together.

Exemplary food systems into which the presently disclosed dry blend system can be incorporated include, but are not limited to, beverages such as alcoholic and non-alcoholic drinks, juices, dietary supplements and the like; dairy products such as milk based products, yogurt, ice cream, sour cream, coffee creamer (coffee whitener), dairy-based desserts, cheese, and the like; non-dairy products such as imitation cheese, sorbet, sherbet, water ice, non-dairy based desserts, and the like; ready mixes; meat products; egg products; spreads; jams and preserves; icings; salad dressings; sauces; condiments; salsa; oil, mayonnaise, and the like.

Other non-limiting suitable examples of food systems into which the dry blend system of the present disclosure can be incorporated are as follows:

Chilled Desserts
Ice Cream, Sherbet, Sorbet, Water Ice
Yogurt (Dairy, Soy) (including fruit-on-the-bottom)
Juice (condensed) and ready to drink (RTD)
Juice Drinks (RTD, Condensed, Instant)
Milk, (Dairy, Soy, Rice) and Milk-Based Beverages (liquid and powdered)
Poultry, Beef, and Pork Products
Jams, Jellies, Preserves, and Spreads
Dips and Salsas
Nutritional Beverages, Shakes and Meal Replacements
RTD Smoothies, Shakes and Meal Replacements
Alcoholic Beverage Mixes
Fruit and Savory Snacks, Candy, and Confections
Icings and Other Bakery Fillings
Sauces, Salad Dressings, and Oils
Coffee, Coffee Based Beverages, and Creamers (instant and liquid)

In another aspect, there is disclosed a method of emulsifying a food system, said method comprising providing a dry blend system comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber, and at least one component selected from the group consisting of hydrocolloids, lipids, carbohydrates, dairy proteins, and egg proteins; and mixing said dry blend system with a liquid system to generate an emulsion, wherein the liquid system is selected from the group consisting of water, water miscible liquids, water immiscible liquids, and microemulsions, wherein said emulsion is devoid of synthetic emulsifiers. Synthetic emulsifiers include, but are not limited to, mono- and diglycerides (MDG), propylene glycol monoesters (PGME), polysorbates, sodium stearoyl lactylate (SSL), gelatins, and the like.

The dry blend system can be mixed with the liquid system and undergo any treatment to generate an emulsion, depending on the steps necessary to produce the desired emulsion. For example, a microemulsion can be made by preparing an aqueous phase, including dissolving any aqueous-soluble components in water; preparing an oil phase, including dissolving any oil-soluble components in oil; and emulsifying the oil and water phases.

In a further aspect, there is disclosed a method of minimizing phase separation in emulsions, said method comprising providing a dry blend system comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber, and at least one component selected from the group consisting of hydrocolloids, lipids, carbohydrates, dairy proteins, and egg proteins; and mixing said dry blend system with a liquid system to generate a food system, wherein the liquid system is selected from the group consisting of water, water miscible liquids, water immiscible liquids, and microemulsions, wherein said emulsion is devoid of synthetic and natural emulsifiers, such as mono- and diglycerides (MDG), propylene glycol monoesters (PGME), polysorbates, sodium stearoyl lactylate (SSL), gelatins, and the like. The dry blend system can be mixed with the liquid system and undergo any treatment to generate an emulsion, depending on the steps necessary to produce the desired emulsion, such as the process described above.

There is also disclosed a method of providing high shear tolerance to a food system, said method comprising providing a dry blend system comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber, and at least one component selected from the group consisting of hydrocolloids, lipids, carbohydrates, dairy proteins, and egg proteins, and mixing said dry blend system with a liquid system to generate a food system, wherein the liquid system is selected from the group consisting of water, water miscible liquids, water immiscible liquids, and microemulsions, wherein the food system demonstrates improved high shear tolerance as compared to a food system devoid of the dry blend system. The dry blend system can be mixed with the liquid system and undergo any treatment, depending on the steps necessary to produce the desired food system. In an embodiment, the food system can be an acidified or cultured dairy system, such as a sour cream application, or a sour dressing application system, such as an imitation sour cream.

There is further disclosed a method of providing thermal stability to a food system during heat treatment, said method comprising providing a dry blend system comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber, and at least one component selected from the group consisting of hydrocolloids, lipids, carbohydrates, dairy proteins, and egg proteins; and mixing said dry blend system with a liquid system to generate a food system, wherein the liquid system is selected from the group consisting of water, water miscible liquids, water immiscible liquids, and microemulsions, wherein the food system demonstrates improved thermal stability during heat treatment as compared to a food system devoid of citrus pulp fiber. The dry blend system can be mixed with the liquid system and undergo any treatment, depending on the steps necessary to produce the desired food system. In an embodiment, the food system can be a neutral beverage system, such as a liquid or instant coffee creamer.

There is additionally disclosed a method of controlling syneresis in a food system, said method comprising providing a dry blend system comprising citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber, and at least one component selected from the group consisting of hydrocolloids, lipids, carbohydrates, dairy proteins, and egg proteins; and mixing said dry blend system with a liquid system to generate a food system, wherein the liquid system is selected from the group consisting of water, water miscible liquids, water immiscible liquids, and microemulsions, wherein the food system demonstrates reduced syneresis as compared to a food system devoid of citrus pulp fiber.

EXAMPLES

The following are examples of foods and beverages containing the disclosed dry blend system comprising various combinations of citrus pulp fiber, hydrocolloids, lipids proteins, carbohydrates, and other ingredients, that demonstrate the desirable characteristics discussed above.

The following examples are presented to illustrate the present disclosure and to assist one of ordinary skill in making and using the same. The examples are not intended in any way to otherwise limit the scope of the disclosure.

Example 1

Sour Cream System

In this example, there are described sour cream systems. The formulations are described in Table 2 below. Blend 1 utilized a stabilizer blend comprising modified food starch, sodium tripolyphosphate, guar gum, PGME, locust bean gum (LBG), and carrageenan standardized with maltodextrin. Blend 1 did not comprise any citrus pulp fiber. Blend 2 utilized a stabilizer blend comprising modified food starch, sodium tripolyphosphate, guar gum, citrus pulp fiber, LGB, and carrageenan standardized with maltodextrin.

TABLE 2

| Ingredients (g) | Blend 1 | Blend 2 |
| --- | --- | --- |
| Water | 25.46 | 27.76 |
| Cream | 65.06 | 65.06 |
| Nonfat Dry Milk | 4.61 | 2.85 |
| Flavoring Blend | 0.03 | 0.03 |
| Stabilizer Blend (no CPF) | 3.64 | 0.00 |
| Acidulant Blend | 1.10 | 0.90 |
| Stabilizer Blend (w/CPF) | 0.00 | 3.30 |
| Potassium Sorbate (preservative) | 0.10 | 0.10 |

Procedure: The dry ingredients were mixed together to form a dry blend system and added to water and cream under good agitation to form a liquid system. The liquid system was then subjected to high-temperature, short-time processing conditions as detailed by the following: the liquid system was heated to 150° F. The liquid system was then homogenized in two stages (1500/500 psi.) The homogenized mix was next heated to a temperature ranging from 180° F. to about 185° F., held at that temperature for about 30 seconds, and thereafter cooled to a temperature ranging from about 70° F. to about 75° F. The cooled mix was then treated with acid and flavor additives to bring the pH to about 4.3 to about 4.5, pumped (at a backpressure ranging from about 50 to about 60 psi) through screens of 80 and 100 mesh, and packed into 1 pound containers and refrigerated. The viscosities of each blend were measured and recorded at Day+1 and Day+9 with a Brookfield T spindle at 10 rpm with a heliopath.

As can be seen in FIG. 1, Blend 1 comprising a traditional, synthetic emulsifier (PGME) demonstrated a viscosity of about 75,000 cps at Day+1 and about 85,000 cps at Day+9.

Blend 2 comprising a stabilizer blend with citrus pulp fiber but no PGME emulsifier demonstrated similar viscosities of about 80,000 cps at Day+1 and almost 90,000 cps at Day+9. Thus, it can be seen that replacing PGME with citrus pulp fiber produces a sour cream that demonstrates comparable viscosities, indicating that citrus pulp fiber can be used as an emulsifier that is at least as effective as PGME.

Moreover, Blend 1 comprised 4.61 g of nonfat dry milk powder, whereas Blend 2 comprised only 2.81 g of nonfat dry milk powder yet produced a sour cream system having similar viscosities to Blend 1. Accordingly, it can be seen that using citrus pulp fibers can reduce the protein and carbohydrate solids content in a sour cream system (and, in turn, the solids content) while retaining emulsion functionality.

Example 2

Imitation Sour Cream System

In this example, there are described imitation sour cream systems. The formulations are described in Table 3 below. Blend 1 utilized a stabilizer blend comprising modified food starch, guar gum, mono- and diglycerides (MDG), locust bean gum (LBG), and carrageenan. Blend 1 did not comprise any citrus pulp fiber. Blend 2 utilized a stabilizer blend comprising citrus pulp fiber and xanthan gum. The acidulant blend comprised lactic acid, citric acid, acetic acid, and N&A flavor.

TABLE 3

| Ingredients (wt. %) | Blend 1 | Blend 2 |
|---|---|---|
| Water | 72.26 | 77.50 |
| Partially Hydrogenated Soybean Oil | 13.82 | 13.82 |
| Nonfat Dry Milk | 9.6 | 4.8 |
| Stabilizer Blend (w/o CPF) | 2.02 | 2.02 |
| Emulsifier | 0.51 | 0.51 |
| Acidulant Blend | 1.49 | 0.8 |
| Stabilizer Blend (w/CPF) | 0.00 | 0.25 |
| Soy Lecithin | 0.20 | 0.20 |
| Potassium Sorbate (preservative) | 0.10 | 0.10 |

Procedure: The soybean oil and emulsifier were mixed and melted together at about 120° F. to form an oil phase. The dry ingredients (minus the acidulant blend) were mixed together to form a dry blend system and then added to water under good agitation to form a water phase. The water phase was then preheated to 120° F., and the oil phase was added to the water phase to form a liquid mix. The liquid mix was then heated to 150° F. and homogenized in two stages at 1500 psi and 500 psi. The liquid mix was then heated to 185° F., cooled to 70° F. The cooled mix was then treated with the acidulant blend to bring the pH to about 4.3 to about 4.5, pumped (at a backpressure ranging from about 50 to about 60 psi) through screens of 80 and 100 mesh, and packed into 1 pound containers and refrigerated. Viscosity measurements were taken on Day+1 and Day+9 using a Brookfield T-spindle at 10 rpm with a heliopath.

Due to the above-described process conditions to produce imitation sour creams, it is necessary that a processed product be able to withstand high levels of imposed shear rates (e.g., through pumping, soothing, mixing, packaging, etc.) is necessary. Moreover, the ability of the processed product to recoup losses of textural integrity, viscosity, gel structure, mouthfeel, body, etc. is extremely desired by manufacturers.

Figure 2:
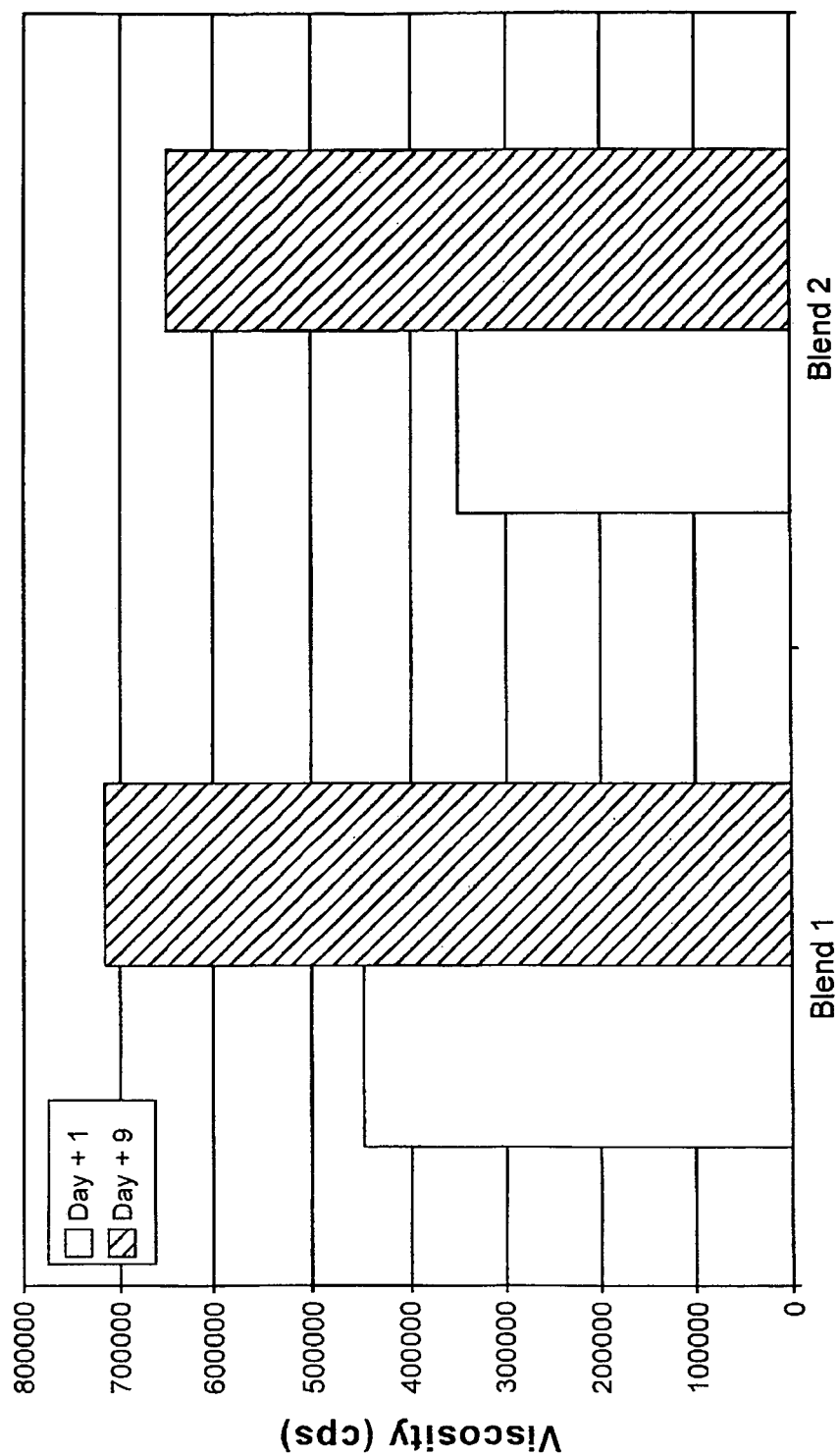
FIG. 2 is a graph comparing viscosities in imitation sour cream systems comprising reduced milk solids.

As can be seen in FIG. 2, Blend 1 (comprising 9.6 wt. % nonfat dry milk and no citrus pulp fiber) demonstrated a viscosity of about 450,000 cps at Day+1 and about 700,000 cps at Day+9. Blend 2 (comprising 4.8 wt. % nonfat dry milk and citrus pulp fiber) demonstrated similar viscosities of about 350,000 cps at Day+1 and about 650,000 cps at Day+9. Thus, it can be seen that using half as much nonfat dry milk (and thus, half as much milk protein) with citrus pulp fiber produces an imitation sour cream that demonstrates comparable viscosities as an imitation sour cream using twice as much nonfat dry milk, indicating that citrus pulp fiber can act as an emulsifier that is at least as effective as milk proteins present in nonfat dry milk. Additionally, a reduced amount of the acidulant blend was used, presumably (and without being limited by theory) because a decreased amount of protein needed to be acidified. Accordingly, it can be seen that citrus pulp fibers can reduce the protein and carbohydrate solids content in an imitation sour cream system (and, in turn, the solids content) while retaining emulsion functionality.

A second imitation sour cream system was also prepared according to the procedure described above with the ingredients as described in Table 4 below, except that viscosity measurements were taken on Day+1 and Day+6.

TABLE 4

| Ingredients (wt. %) | Blend 1 | Blend 2 |
|---|---|---|
| Water | 77.32 | 76.84 |
| Partially Hydrogenated Soybean Oil | 13.82 | 0.0 |
| Palm Oil | 0.0 | 13.82 |
| Nonfat Dry Milk | 4.79 | 4.79 |
| Stabilizer Blend (w/o CPF) | 2.12 | 2.12 |
| Emulsifier | 0.60 | 0.60 |
| Acidulant Blend | 0.8 | 0.8 |
| Stabilizer Blend (w/CPF) | 0.25 | 0.63 |
| Soy Lecithin | 0.20 | 0.20 |
| Potassium Sorbate (preservative) | 0.10 | 0.10 |

Figure 3:
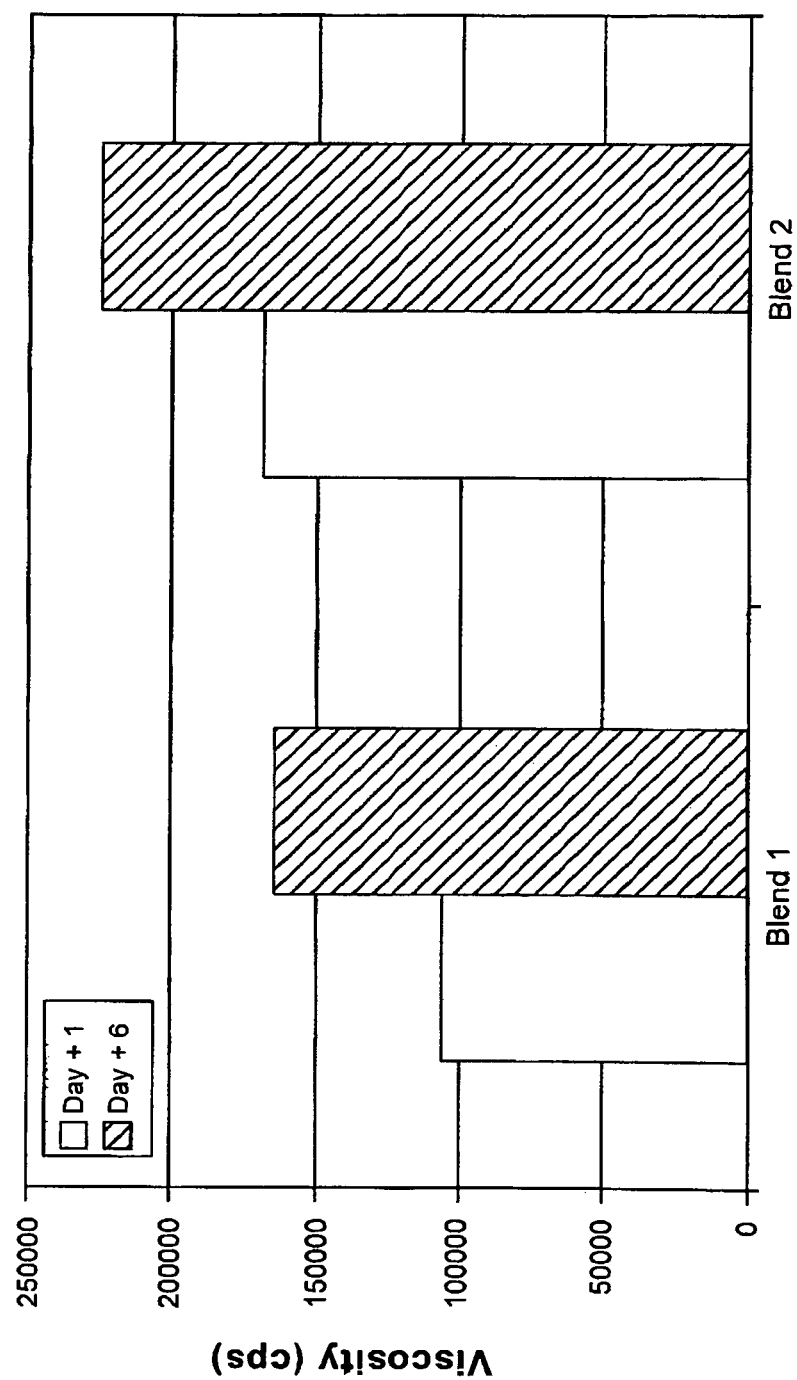
FIG. 3 is a graph comparing viscosities in imitation sour cream systems comprising reduced trans fats.

As can be seen in FIG. 3, Blend 1 (comprising hydrogenated soybean oil, e.g., trans fats) demonstrated a viscosity of about 100,000 cps at Day+1 and over about 150,000 cps at Day+9. However, Blend 2 (comprising palm oil, e.g., saturated fats, and citrus pulp fiber) demonstrated greater viscosities of over about 150,000 cps at Day+1 and about 225,000 cps at Day+9.

Thus, it can be seen that using palm oil (comprising saturated fats) and citrus pulp fiber produced an imitation sour cream that demonstrated greater viscosities than an imitation sour cream using partially hydrogenated soybean oil (comprising trans fats). Accordingly, a healthier imitation sour cream can be made (e.g., an imitation sour cream without trans fats) using citrus pulp fiber, while retaining (and recouping) desirable textural characteristics and functionalities, such as viscosity and textural integrity.

Example 3

Ice Cream System

In this example, there are described ice cream systems. Seven ice cream systems comprised the ingredients described in Table 5 below.

TABLE 5

| Ingredients (wt. %) | Comp. 1 | Comp. 2 | Comp. 3 | Comp. 4 | Comp. 5 | Comp. 6 | Comp. 7 |
|---|---|---|---|---|---|---|---|
| Guar Gum | 0.0825 | 0.0825 | 0.0825 | 0.0825 | 0.0825 | 0.0825 | 0.0825 |
| MDG | 0.495 | 0 | 0 | 0 | 0 | 0 | 0 |
| Dextrose | 0.099 | 0.231 | 0.2244 | 0.2244 | 0.2244 | 0.2244 | 0.2244 |
| MDG w/Polysorbate 80 | 0.0825 | 0 | 0 | 0 | 0 | 0 | 0 |
| LBG | 0.165 | 0.0165 | 0.198 | 0.198 | 0.198 | 0.198 | 0.198 |
| Carrageenan | 0.00003 | 0.00003 | 0 | 0 | 0 | 0 | 0 |
| Citrus Pulp Fiber (CitriFi ™ 100 FG) | 0 | 0 | 0.2 | 0 | 0 | 0 | 0 |
| Citrus Pulp Fiber (Early/Mid A) | 0 | 0 | 0 | 0.2 | 0 | 0 | 0 |
| Citrus Pulp Fiber (Early/Mid B) | 0 | 0 | 0 | 0 | 0.2 | 0 | 0 |
| Citrus Pulp Fiber (Valencia A) | 0 | 0 | 0 | 0 | 0 | 0.2 | 0 |
| Citrus Pulp Fiber (Valencia B) | 0 | 0 | 0 | 0 | 0 | 0 | 0.2 |
| Cream | 18.25 | 18.25 | 18.25 | 18.25 | 18.25 | 18.25 | 18.25 |
| Whole Milk | 59.42 | 59.42 | 59.22 | 59.22 | 59.22 | 59.22 | 59.22 |
| Nonfat Drymilk Powder | 4 | 4 | 4 | 4 | 4 | 4 | 4 |
| Sucrose | 12 | 12 | 12 | 12 | 12 | 12 | 12 |
| Stabilizer | 0.33 | 0.33 | 0.33 | 0.33 | 0.33 | 0.33 | 0.33 |
| Corn Syrup Solids | 6 | 6 | 6 | 6 | 6 | 6 | 6 |

Figure 4:
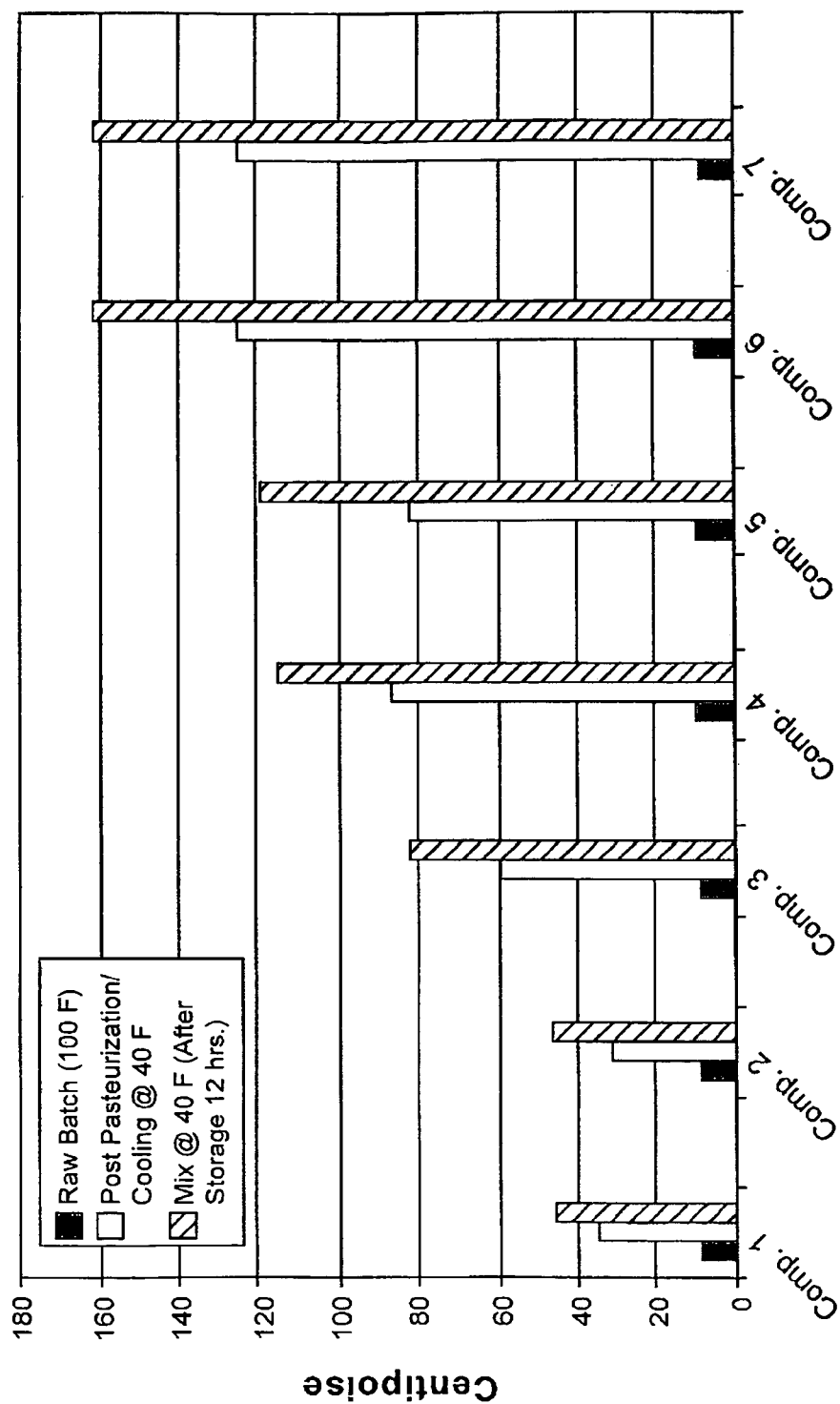
FIG. 4 is a graph comparing viscosities in ice cream systems.

Procedure: The dry ingredients were mixed together to form a dry blend system. The liquid ingredients were mixed and preheated to 100° F. to form a liquid system. The liquid system was then mixed with the dry blend system, and hydrated for 10 minutes. The viscosity of the hydrated mix was checked with a Brookfield viscometer. This hydrated mix was then pasteurized at a temperature ranging from about 180° F. to about 185° F. for 30 seconds, and homogenized at 2500 psi. The homogenized mix was thereafter cooled to a temperature of about 40° F. and aged overnight for 12 to 24 hours. The viscosity of the mix was checked after cooling to about 40° F., and again after 12 hours aging. Then, 125 mL of vanilla flavoring was added for every 60 lbs of mix, and the mix was then frozen and stored in a deep freezer. The viscosity results are shown in FIG. 4.

After 24 hours, meltdown properties for each ice cream system was evaluated by melting each system over 120 minutes, collecting the melted mass, and recording the accumulated melted mass every 10 minutes. Results after 40 minutes are shown in FIG. 5 and results after 120 minutes are shown in FIG. 6.

As discussed above, post pasteurization viscosity can be an indicator of interfacial surface composition control, which is an important factor in producing a desirable finished product with smooth mouthfeel. As can be seen in FIG. 4, ice cream systems comprising citrus pulp fiber demonstrated high post pasteurization viscosity values, indicating stable emulsions were formed.

Moreover, when ice cream is placed in an ambient environment (e.g., a scoop on a plate), it begins to melt. The melting of ice cream is a function of emulsion instability. As can be seen in FIGS. 5 and 6, ice cream systems comprising citrus pulp fiber demonstrated acceptable melt characteristics without synthetic emulsifiers, such as MDG and polysorbates. Furthermore, ice cream systems comprising citrus pulp fiber demonstrated melt characteristics comparable to a commercially available ice cream produced by Breyer's®.

Figure 5:
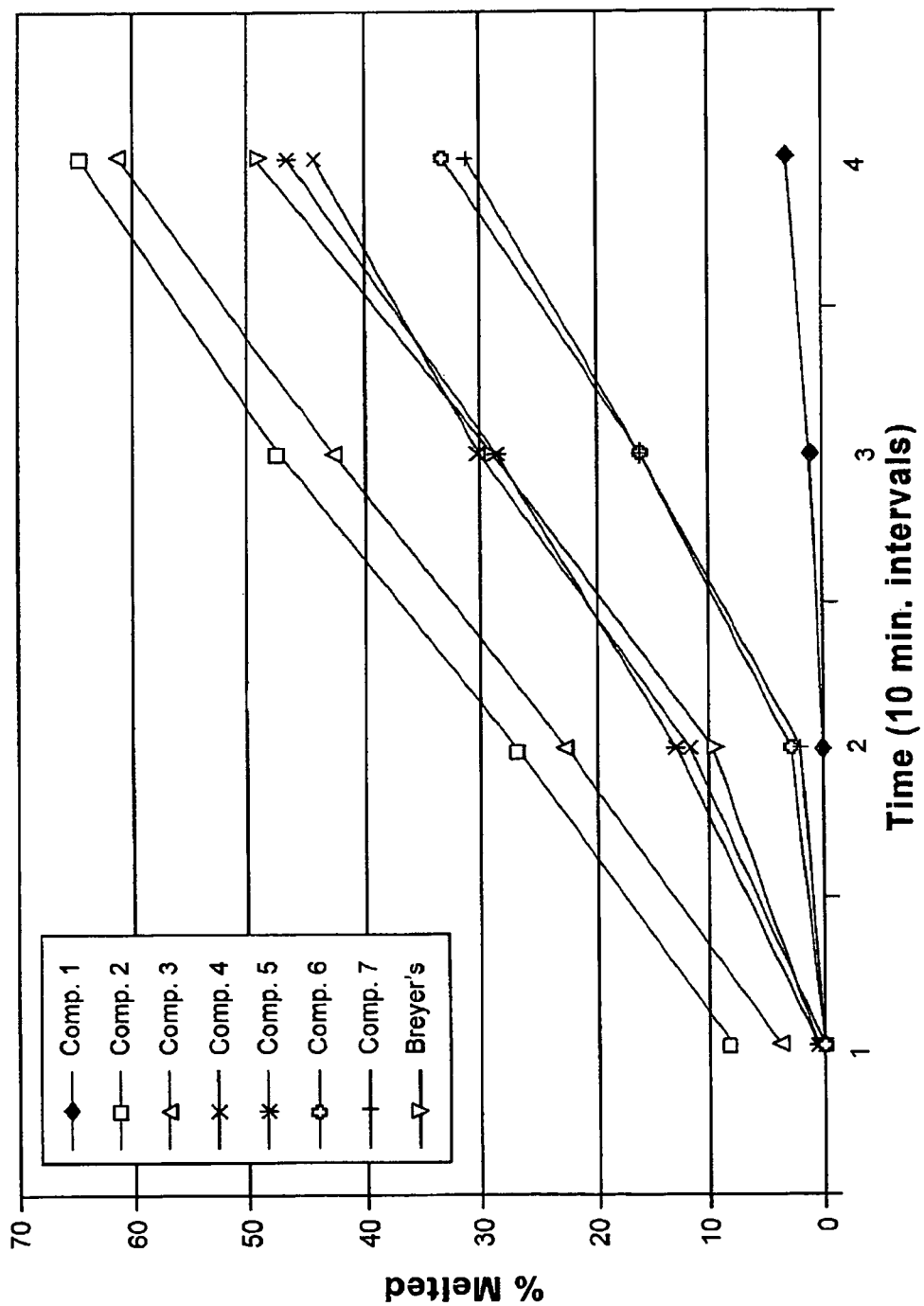
FIG. 5 is a graph comparing meltdown properties in ice cream systems over 40 minutes.
Figure 6:
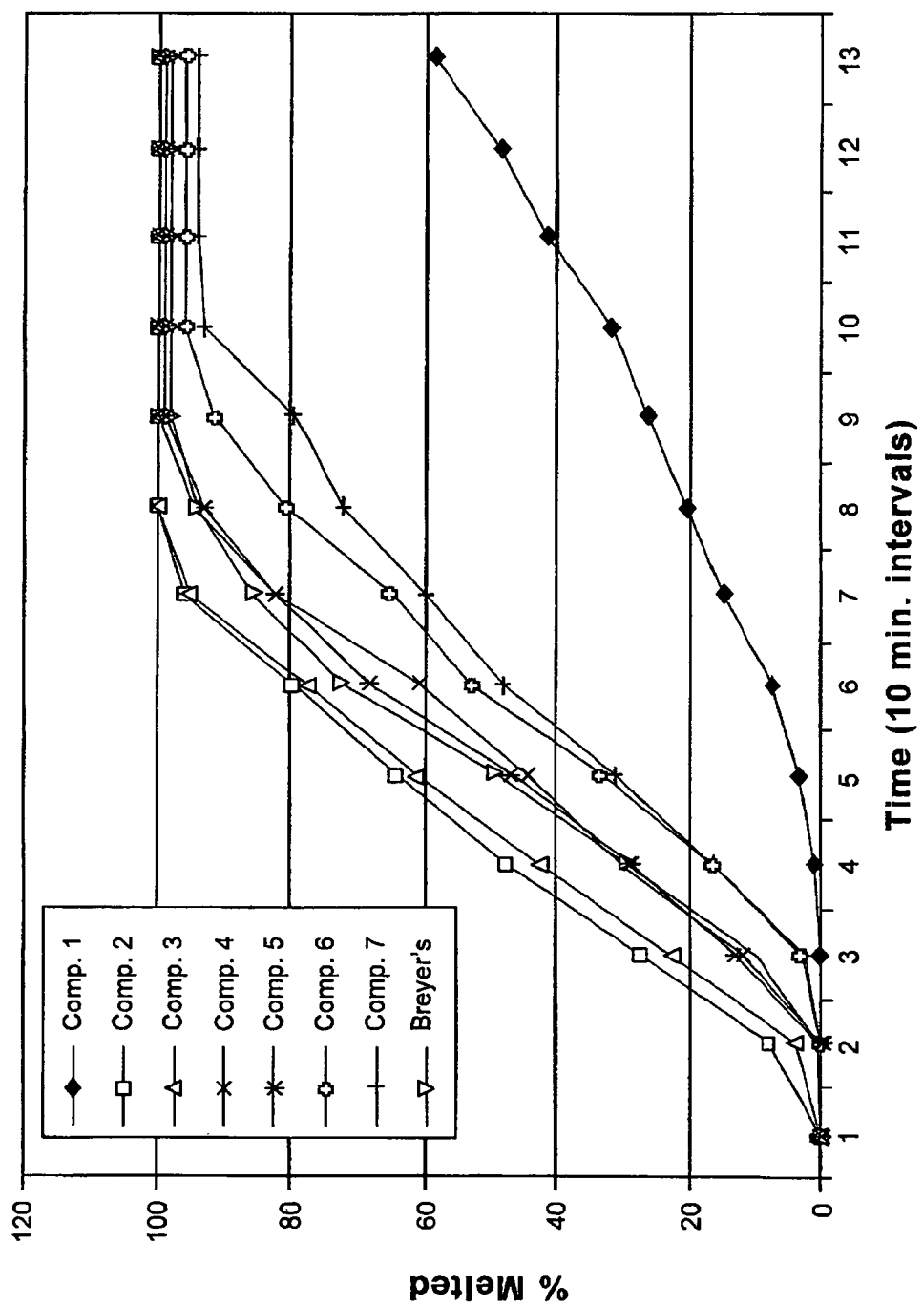
FIG. 6 is a graph comparing meltdown properties in ice cream systems over 120 minutes.

For instance, as can be seen in FIG. 5, Compositions 2 and 3 demonstrated over 40% melted mass at 30 minutes, whereas Compositions 4 through 7 demonstrated about 30% melted mass or under for the same amount of time. In fact, Compositions 6 and 7 demonstrated under about 20% melted mass at 30 minutes.

At 60 minutes, Compositions 2 and 3 demonstrated almost 80% melted mass, whereas Composition 4 demonstrated about 60% melted mass, and Compositions 6 and 7 demonstrated under about 60% melted mass, as can be seen in FIG. 5. Thus, it can be seen that replacing MDG and polysorbates with citrus pulp fiber produces an ice cream that demonstrates acceptable post pasteurization viscosities and melt characteristics, indicating that citrus pulp fiber can provide acceptable emulsifier functionality in place of synthetic emulsifiers. Moreover, it can be seen that by using citrus pulp fiber, an ice cream product can be produced using only naturally-sourced materials (e.g., without MDG and polysorbates) while still demonstrating desirable melt characteristics and post pasteurization viscosity.

Example 4

Coffee Creamer Application

In this example, there are described coffee creamer applications. Four coffee creamer systems comprised the ingredients described in Table 6 below. The stabilizer base comprised salts, emulsifiers, and hydrocolloids.

TABLE 6

| Ingredients (wt. %) | Comp. 1 | Comp. 2 | Comp. 3 | Comp. 4 | Comp. 5 |
|---|---|---|---|---|---|
| Skim Milk | 56.3 | 56.3 | 56.3 | 56.3 | 56.3 |
| Whole Milk | 31.3 | 31.3 | 31.3 | 31.3 | 31.3 |
| Corn Syrup Solids | 9.0 | 9.0 | 9.0 | 9.0 | 9.0 |
| Titanium Dioxide | 0.55 | 0.55 | 0.55 | 0.55 | 0.55 |
| Stabilizer Base | 0.60 | 0.60 | 0.60 | 0.60 | 0.60 |
| CitriFi ™ 100M 40 | 0.0 | 0.15 | 0.0 | 0.0 | 0.0 |
| CPF from E/M oranges | 0.0 | 0.0 | 0.15 | 0.0 | 0.0 |
| CPF from Valencia oranges | 0.0 | 0.0 | 0.0 | 0.15 | 0.0 |

TABLE 6-continued

| Ingredients (wt. %) | Comp. 1 | Comp. 2 | Comp. 3 | Comp. 4 | Comp. 5 |
|---|---|---|---|---|---|
| Sodium Caseinate | 0.0 | 0.0 | 0.0 | 0.0 | 0.25 |
| Sodium Stearoyl Lactylate | 0.0 | 0.0 | 0.0 | 0.0 | 0.10 |

Procedure: The liquid ingredients were mixed to form a liquid system and preheated to 130° F. The dry ingredients were mixed together to form a dry blend system and mixed with the liquid system at 130° F. The mixed system was then heated to 185° F. and homogenized at 2500 psi. This mixed system was then pasteurized at about 260° F. for a short period of time, and thereafter cooled to a temperature of about 40° F., packaged, and refrigerated.

When subjected to visual evaluation for serum separation (an indicator of emulsion instability), Composition 1 (comprising no emulsifier) and Composition 2 (comprising CitriFi™ 100M 40, available from Fiberstar, Inc. of Willmar, Minn.) separated into two layers, indicating emulsion instability. However, Compositions 3 and 4 (comprising citrus pulp fiber (CPF) produced from a process as described in WO 2006/033697) and E Composition Example 4 (comprising sodium caseinate and SSL) demonstrated no serum separation, indicating stable emulsions were formed. Thus, it can be seen that substituting citrus pulp fiber for caseinates and SSL formed a stable emulsion and produced a stabilized coffee creamer which did not separate, indicating that citrus pulp fibers impart functionality to stabilize the coffee creamer system.

Moreover, Compositions 3 and 4, which comprised 0.15 wt. % of citrus pulp fiber, formed an emulsion as stable as Composition 5, which comprised 0.25 wt. % of caseinates and 0.10 wt. % of SSL (for a combined total of 0.35 wt. % caseinates and SSL.) Thus, it can be seen that citrus pulp fiber can be used to achieve the same function as almost twice as much caseinates and SSL. Accordingly, it can be seen that using citrus pulp fibers can reduce the protein and carbohydrate solids content in a coffee creamer system (and, in turn, the solids content) while maintaining emulsion functionality.

Another coffee creamer system was also made with the ingredients as listed in Table 7 below, including two types of n-octenyl succinate (nOSA) starches. nOSA Starch A was a precursor nOSA starch, and nOSA Starch B was an instant nOSA starch. The stabilizer base in Compositions 4 and 5 did not comprise SSL or xanthan gum, whereas the stabilizer base in Examples 1 and 2 did.

TABLE 7

| Ingredients (wt. %) | Comp. 1 | Comp. 2 | Comp. 3 | Comp. 4 | Comp. 5 |
|---|---|---|---|---|---|
| Water | 86.75 | 86.75 | 86.75 | 86.75 | 86.75 |
| Shortening | 2.00 | 2.00 | 2.00 | 2.00 | 2.00 |
| Corn Syrup Solids | 10.35 | 10.15 | 9.95 | 9.70 | 9.70 |
| Polysorbate 60 | 0.10 | 0.10 | 0.00 | 0.00 | 0.00 |
| Stabilizer Base | 0.80 | 0.80 | 0.80 | 0.80 | 0.90 |
| nOSA Starch A | 0.00 | 0.00 | 0.30 | 0.00 | 0.40 |
| Citrus Pulp Fiber | 0.00 | 0.00 | 0.075 | 0.17 | 0.10 |
| nOSA Starch B | 0.00 | 0.00 | 0.00 | 0.32 | 0.00 |
| Sodium Caseinate | 0.00 | 0.20 | 0.00 | 0.00 | 0.00 |

Procedure: The water and shortening were mixed and preheated to 130° F. to form a liquid system. The polysorbate was then added to the liquid system. The dry ingredients were then mixed together to form a dry blend system and mixed with the liquid system at 130° F. The mixed system was then heated to 185° F. and homogenized at 2500 psi. This mixed system was then pasteurized at about 260° F. for a short period of time, and thereafter cooled to a temperature of about 40° F., packaged, and refrigerated. The viscosity of the coffee creamer system was tested after 1 day using a Brookfield LVT spindle.

Figure 7:
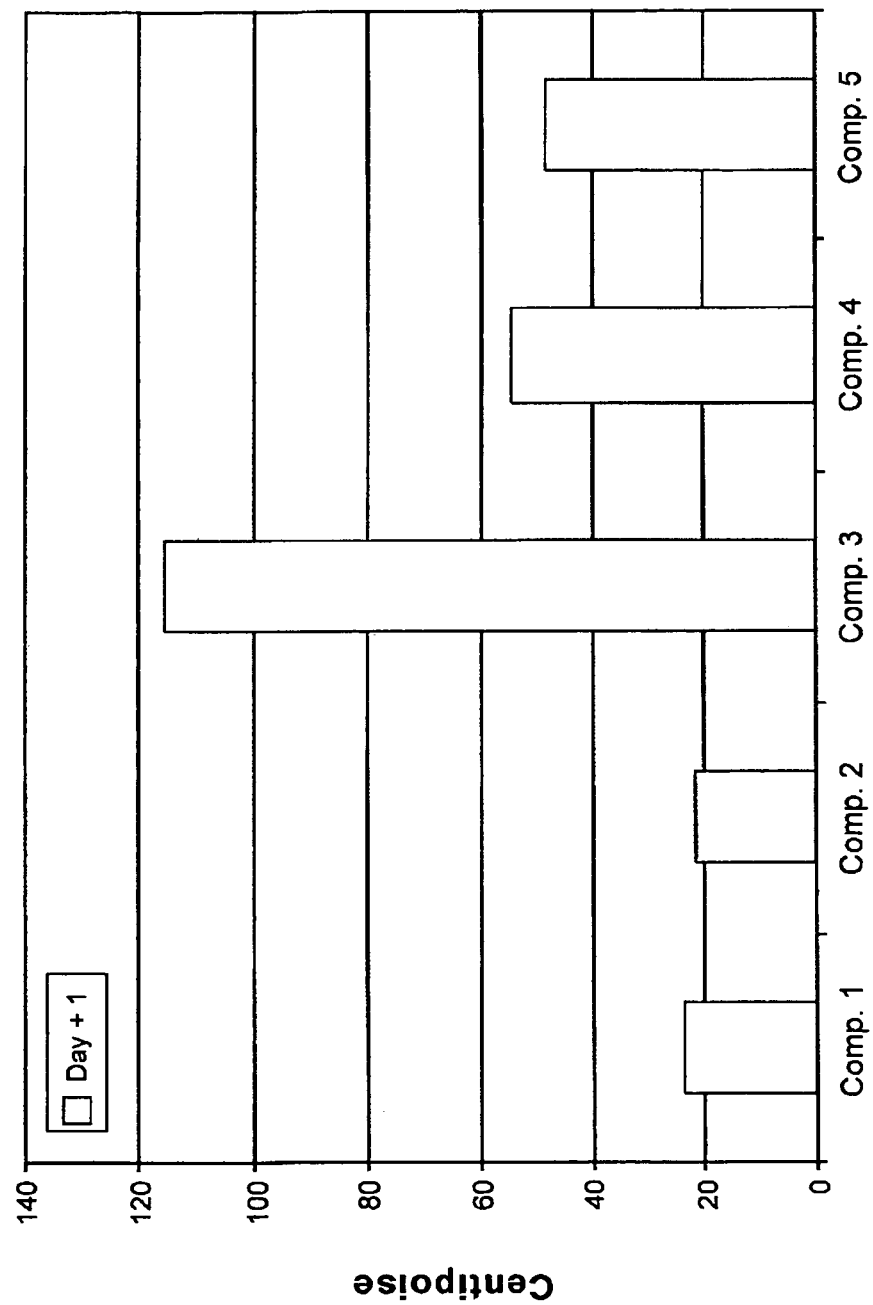
FIG. 7 is a graph comparing viscosities in coffee creamer systems.

As can be seen in FIG. 7, Compositions 3 through 5 (comprising a nOSA starch with citrus pulp fiber) demonstrated much higher viscosities (indicating good emulsion stability), as compared to Composition 2 (comprising sodium caseinate) and Composition 1. In fact, Compositions 4 and 5 demonstrated viscosities at least twice as high, if not more, than Compositions 1 and 2. Moreover, Composition 3 demonstrated a viscosity almost six times as high as Compositions 1 and 2. Furthermore, Compositions 4 and 5 (comprising no SSL or polysorbates) demonstrated viscosities at least twice as high, if not more, than Compositions 1 and 2 (comprising SSL and polysorbate).

Thus, it can be seen that coffee creamer systems comprising a nOSA starch and citrus pulp fiber can effectively replace caseinates, SSL, and polysorbates while maintaining stable emulsions. Accordingly, it can be seen that using citrus pulp fibers can reduce the protein and carbohydrate solids content in a coffee creamer system (and, in turn, the solids content) while maintaining emulsion functionality. It can also be seen that citrus pulp fiber can synergistically act with carbohydrates (such as an nOSA starch) and hydrocolloids (such as xanthan gum) to improve functionality, as demonstrated by Example 3.

Example 5

Icing System

In this example, there are described icing systems. Composition 1 comprised 0.25 wt. % agar. Composition 2 comprised 0.5 wt. % citrus pulp fiber. Composition 3 comprised 0.25 wt. % agar and 0.3 wt. % E/M citrus pulp fiber. Composition 4 comprised 0.25 wt. % agar and 0.5 wt. % E/M citrus pulp fiber. Composition 5 comprised 0.25 wt. % agar and 1.0 wt. % E/M citrus pulp fiber.

Figure 8:
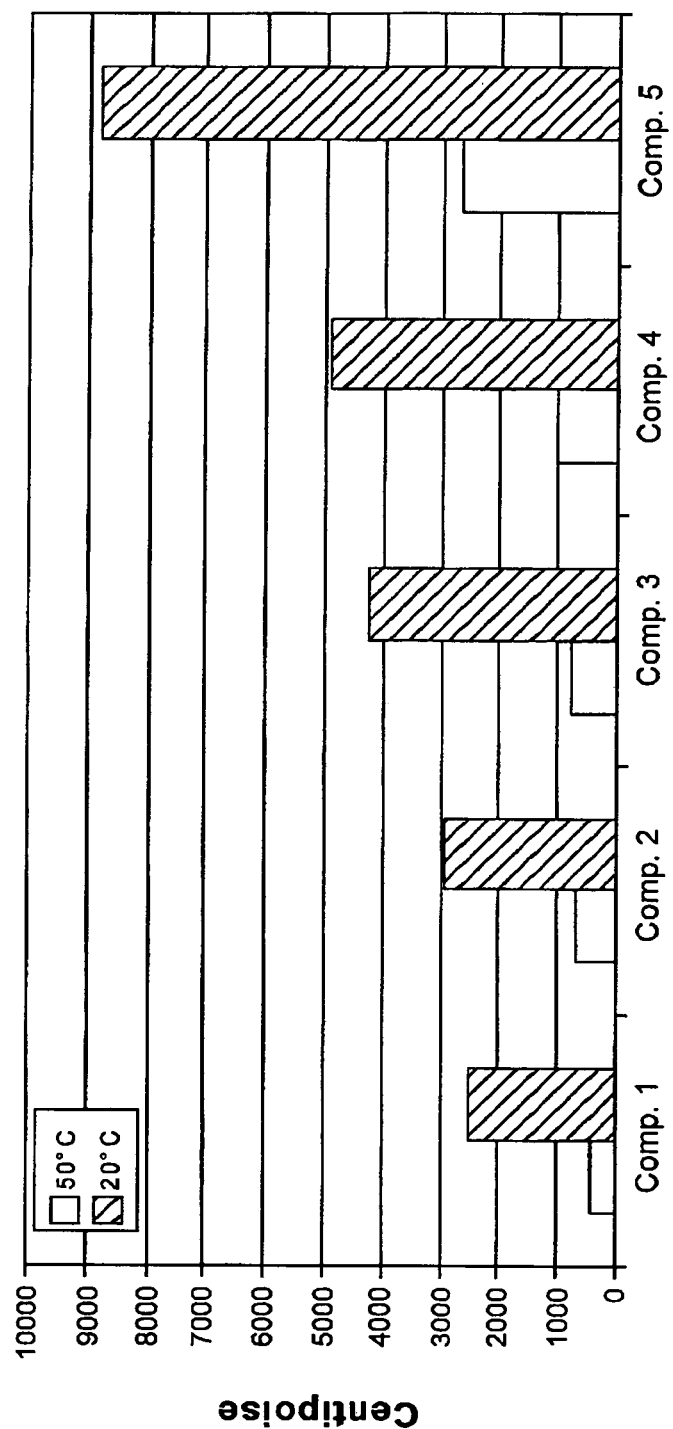
FIG. 8 is a graph comparing viscosities in icing systems.

As can be seen in FIG. 8, Composition 5 (comprising agar and 1.0 wt. % citrus pulp fiber) demonstrated the thickest viscosity when tested with a Rapid Visco Analyzer at 50° C. and 20° C. When subjected to visual evaluation for syneresis (an indicator of freeze/thaw stability), Composition 5 demonstrated little to no syneresis. Similarly, Composition 1 (comprising agar alone) demonstrated little to no syneresis; however, it demonstrated the lowest viscosity at 50° C. and 20° C.

For example, at 50° C., Composition 4 had a viscosity of almost 3,000 cps, as compared to about 500 cps for Composition 1. At 20° C., Composition 4 had a viscosity of almost 9,000 cps, as compared to about 2,500 cps for Composition 1. Furthermore, Composition 2 (comprising citrus pulp fiber alone) had viscosities similar to Example 1 at 50° C. and 20° C. Thus, it can be seen that an icing system comprising at least one hydrocolloid, such as agar, and citrus pulp fiber provides better viscosity-enhancing functionality than an icing system comprising agar or citrus pulp fiber alone, indicating that citrus pulp fiber acts synergistically with a hydrocolloid to improve viscosity and control syneresis.

Example 6

Meat System

Nine meatball systems were prepared according to the ingredients as described in Table 8 below.

TABLE 8

| Ingredients | | Cook Yield (%) |
|---|---|---|
| Example 1 | — | 59.05 |
| Example 2 | Control | 80.79 |
| Example 3 | Breadcrumbs | 84.86 |
| Example 4 | Soy flour/Starch blend | 78.32 |
| Example 5 | 1% CitriFi ™ | 78.89 |
| Example 6 | 1% CitriFi ™ FG | 77.64 |
| Example 7 | 1% CitriFi ™ M 40 | 78.53 |
| Example 8 | 0.45% $NaPO_4$ | 83.00 |
| Example 9 | 0.45% NuRice | 79.66 |

Procedure: Nine Examples were created by mixing meat with various dry blend systems comprising each of the ingredients listed in Table 8. During mixing, the viscosity of each Composition was visually noted. The weights of each Composition were also noted before and after cooking through a long, linear impingement oven at 170° F. Thereafter, the cook yield of each Composition was calculated. As can be seen in Table 8, Compositions 5 through 7 (comprising citrus pulp fiber) demonstrated cook yields of 78.89%, 77.64%, and 78.53%, respectively, which are similar to the cook yield of 78.32% for Composition 4 (comprising the soy flour/starch blend). A reduced cook yield indicates that some emulsion functionality was lost; the lower the cook yield, the more emulsion functionality that was lost. Thus, it can be seen that citrus pulp fibers can reduce the protein solids content in an emulsified meat system (and, in turn, the solids content) in a meatball system while retaining emulsion functionality under hot conditions.

One of ordinary skill in the art could also produce an emulsified meat system by substituting fat, such as pork fat, with a mixture comprising water and citrus pulp fiber. The mixture can comprise a ratio of citrus pulp fiber to water ranging from about 1:7 to about 1:9, for example from about 1:7 to about 1:8 or about 1:8 to about 1:9. However, one skilled in the art would understand that these ranges are subject to variation, for example when hydrocolloids are used with citrus pulp fiber. One of ordinary skill in the art could also produce an emulsified meat system by substituting fat with a wet system comprising water and a dry blend system comprising citrus pulp fiber and hydrocolloid. The wet system can comprise a ratio of dry blend system to water ranging from about 1:10 to about 1:15, such as from about 1:10 to about 1:11. For example, a skilled person could make an emulsified meat product using a dry blend system comprising 65% citrus pulp fiber and 40% hydrocolloid, such as carageenans and alginates.

One skilled in the art could also produce an emulsified meat product by substituting fat with a wet system comprising water and a dry blend system comprising citrus pulp fiber, hydrocolloid, and soy protein. For example, a skilled person could make an emulsified meat product using a dry blend system comprising 65% citrus pulp fiber and 35% hydrocolloid, such as carageenans and alginates. Another dry blend system that can be used comprises 20% citrus pulp fiber, 5% hydrocolloid, carageenans and alginates, and 75% soy flour, such as the Prolia® line of soy flours, marketed by Cargill, Inc. of Wayzata, Minn. The dry blend system can be used as a substitute for isolated soy protein at a one-third dosage (e.g., one-third as much dry blend system is necessary for a designated amount of soy flour.)

Thus, it can be seen that citrus pulp fiber can be used to achieve the same function as almost one-third as much soy protein. Accordingly, it can be seen that citrus pulp fibers can reduce the fat, protein, and hydrocolloid solids content in an emulsified meat system (and, in turn, the solids content) while retaining emulsion functionality.

One skilled in the art could partially substitute (up to about 50%, for example about 25%, such as about 15%) the fat content in the emulsified meat systems with citrus pulp fiber, without modifying (or only to a small extent) the organoleptic properties of the finished meat product. One skilled in the art could totally substitute (up to about 100%, for example about 75%, such as about 85%) the fat content in the emulsified meat systems with citrus pulp fiber to produce an acceptable meat product, although with more pronounced differences in taste (more "spiced"), texture (a little less creamy), firmness (a little softer), and color (a bit more intense). The finished meat products can contain up to about 3% citrus pulp fiber, for example about 2%, such as about 1%, without the apparent taste of citrus pulp fiber in the finished meat product.

Example 7

Process Cheese Application

In this example, there are described process cheese applications. Four process cheese systems comprised the ingredients described in Table 9 below. The protein content in Compositions 1 through 4 was about 7%.

TABLE 9

| Ingredients (wt. %) | Comp. 1 | Comp. 2 | Comp. 3 | Comp. 4 |
|---|---|---|---|---|
| Water | 55.9 | 55.9 | 55.9 | 55.9 |
| Cheddar Fontera | 11 | 11 | 11 | 11 |
| Anhydrous Milk Fat | 18.4 | 18.4 | 18.4 | 18.4 |
| Skim Milk Powder | 5 | 5 | 5 | 5 |
| Acid casein | 3 | 3 | 3 | 3 |
| Lactose | 2.9 | 2.9 | 2.9 | 2.9 |
| Melting Salts | 2.5 | 2.5 | 2.5 | 2.5 |
| Citrus Pulp Fiber | 1 | 0 | 1 | 0 |
| Blend of LBG/Xanthan | 0 | 0.3 | 0.3 | 0.3 |
| Modified Food Starch | 0 | 0 | 0 | 1 |
| Dextrose | 0.3 | 1 | 0 | 0 |
| Citric Acid (powder) | 0.35 | 0.35 | 0.35 | 0.35 |

Procedure: The dry ingredients were blended together to form a dry blend system, and the resultant dry blend system was dispensed into a 5 L Stephan cooker. The water was then added into the Stephan cooker to form a liquid system, which was blended for 30 seconds at 750 rpm. The blended system was then vacuumed at 0.5 barr, and pasteurized at 95° C. for 5 minutes, and homogenized at 1700 rpm via a double skinned jacket. The homogenized system was then cooled to 80° C. and held at that temperature for 4 minutes at 800 rpm.

Figure 9:
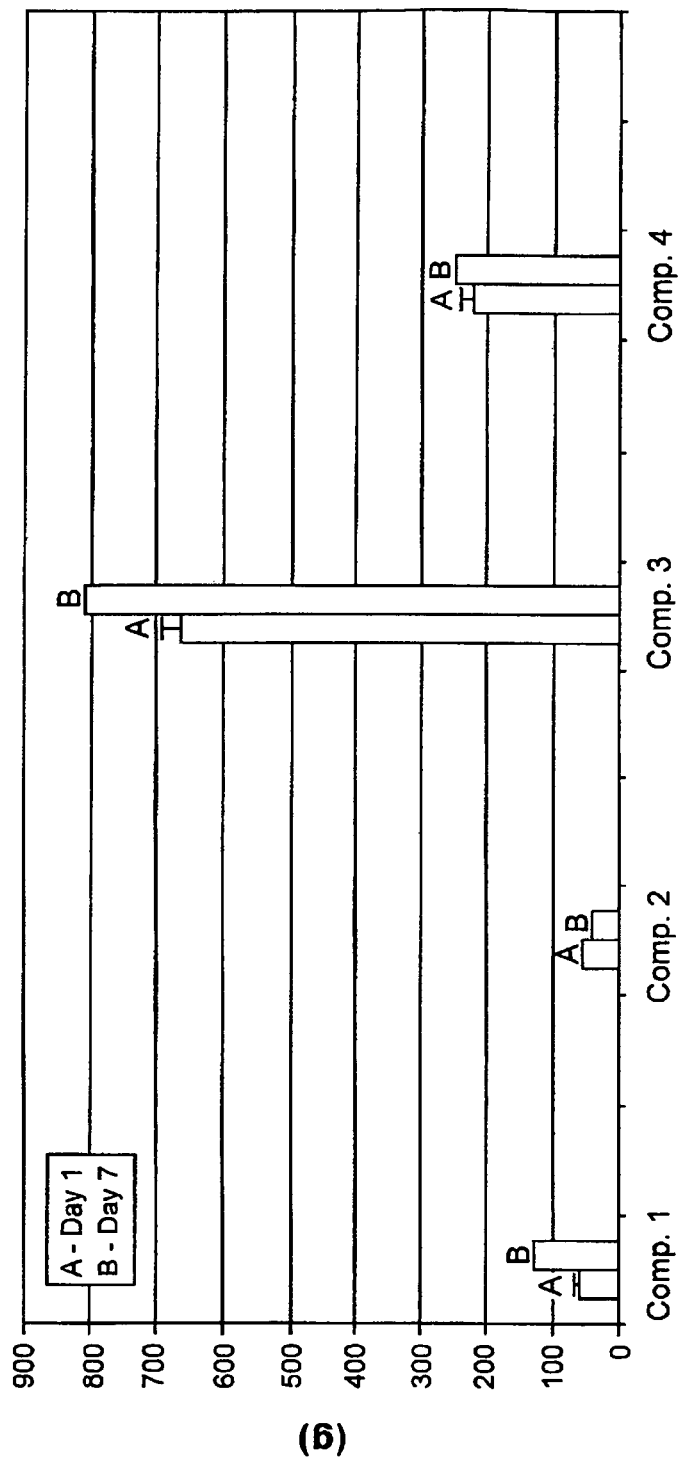
FIG. 9 is a graph comparing spreadability in process cheese systems.
Figure 12:
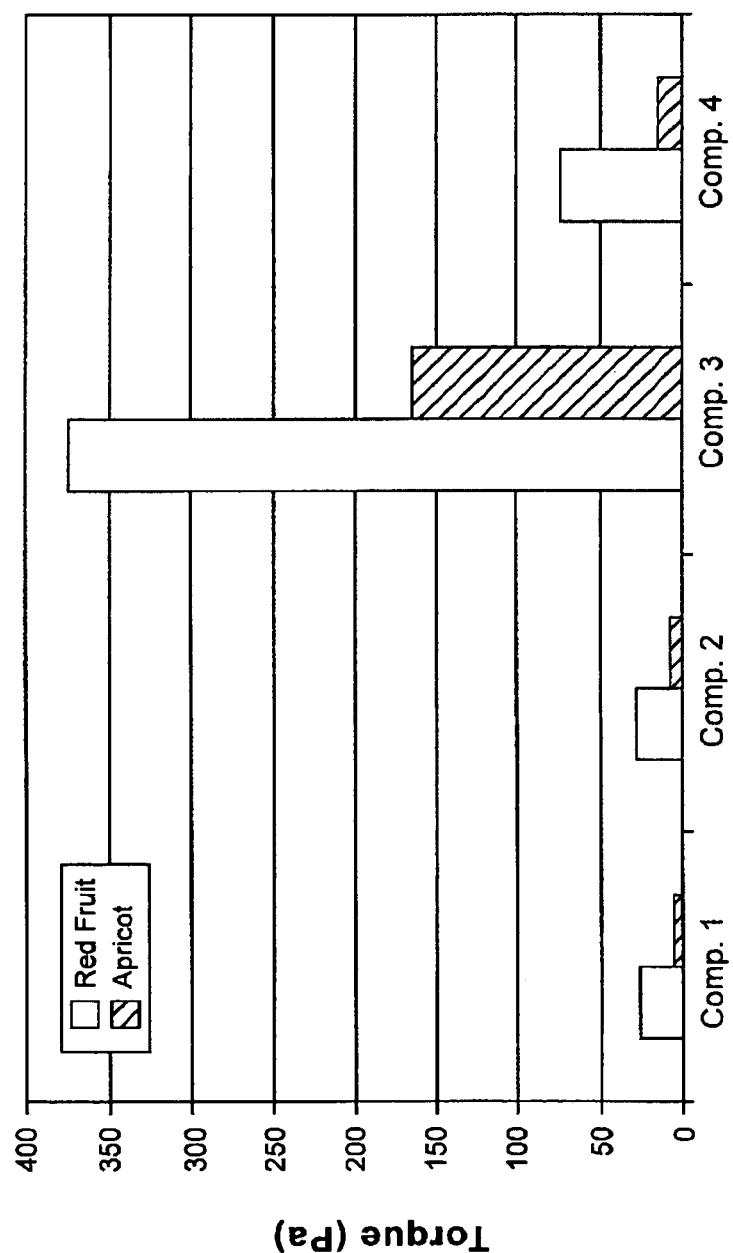
FIG. 12 is a graph comparing viscosities in fruit application systems.
Figure 13:
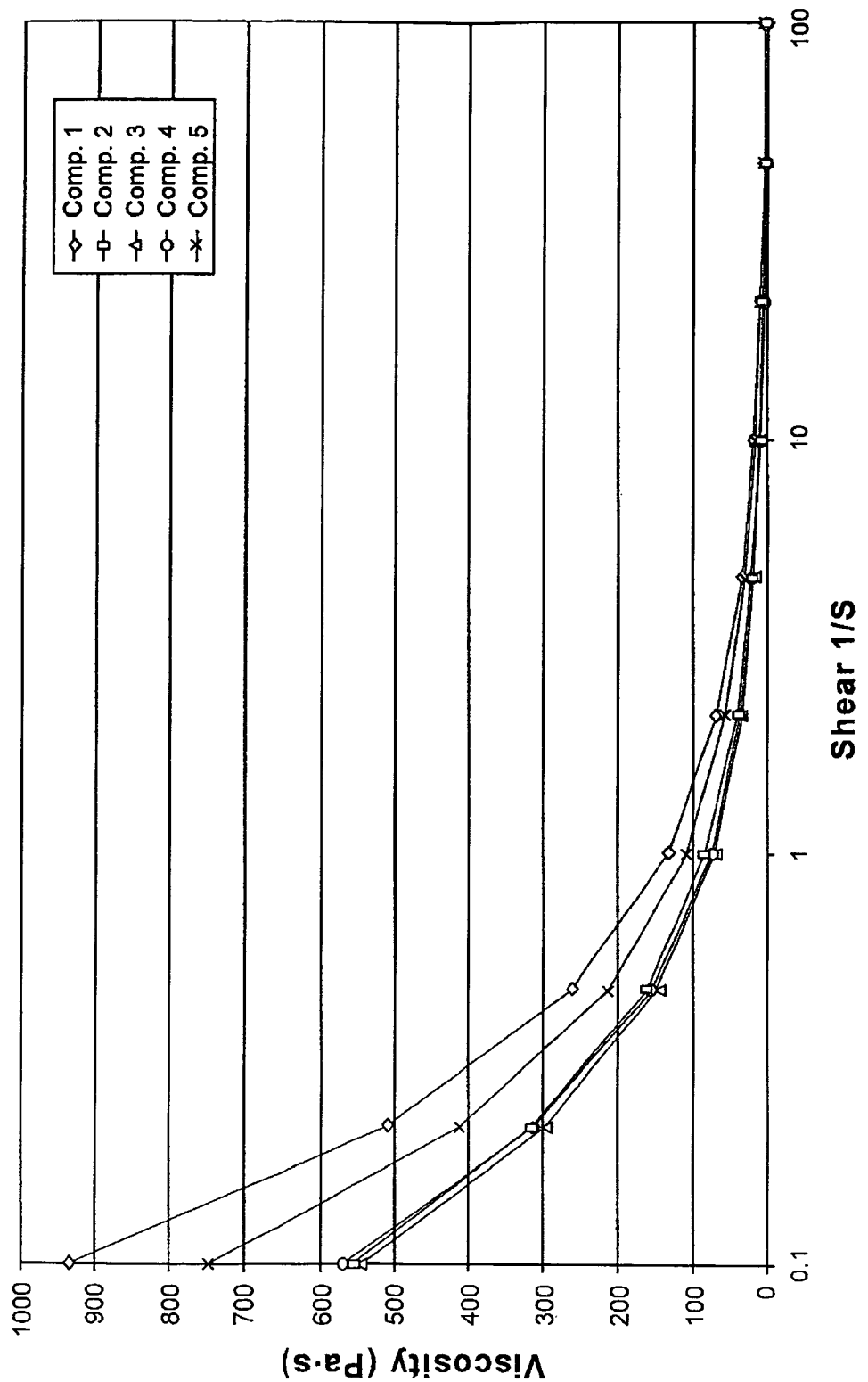
FIG. 13 is a graph comparing viscosities in convenience oil dressing systems.

Thereafter, the process cheese system was dispensed into molds. A TAXT2 texture analyzer was used to measure spreadability of the process cheese system on Day 1 and again after 7 days. The results are shown in FIG. 9. The viscosity of the process cheese system was also measured at 80° C., 75° C., and 70° C., and the results are shown in FIG. 12. The gel strength of the process cheese was also measured on Day 1 and Day 7, and the results are shown in FIG. 13.

Figure 10:
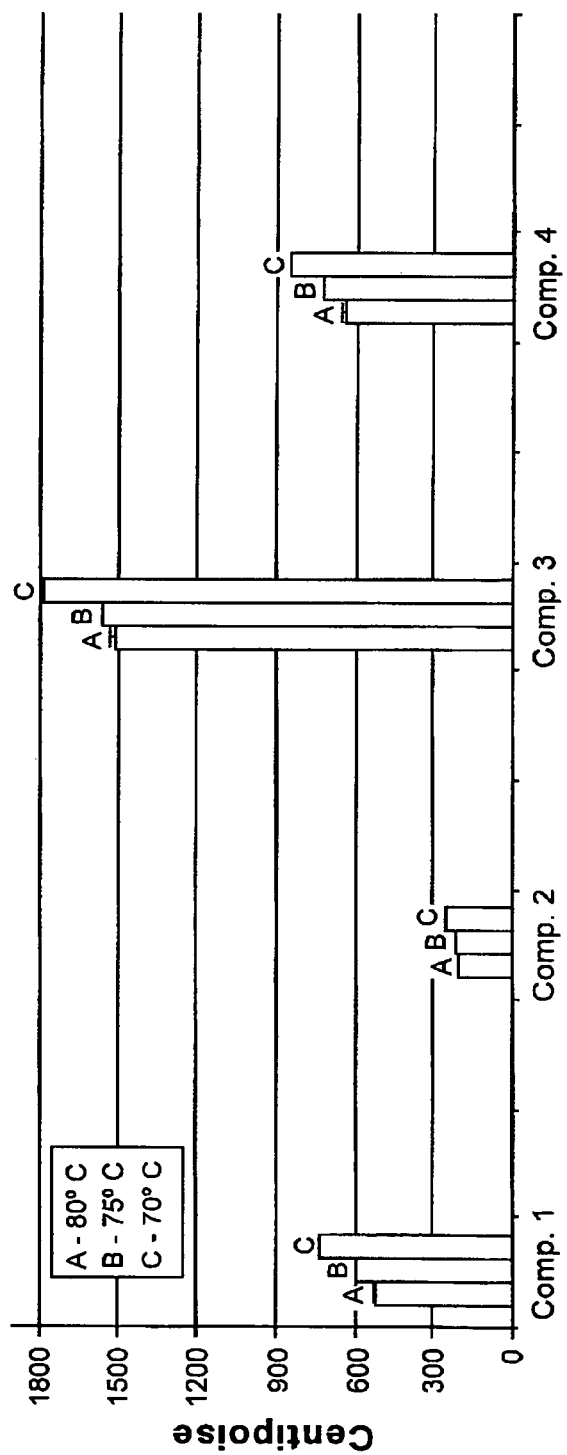
FIG. 10 is a graph comparing viscosities in process cheese systems.
Figure 11:
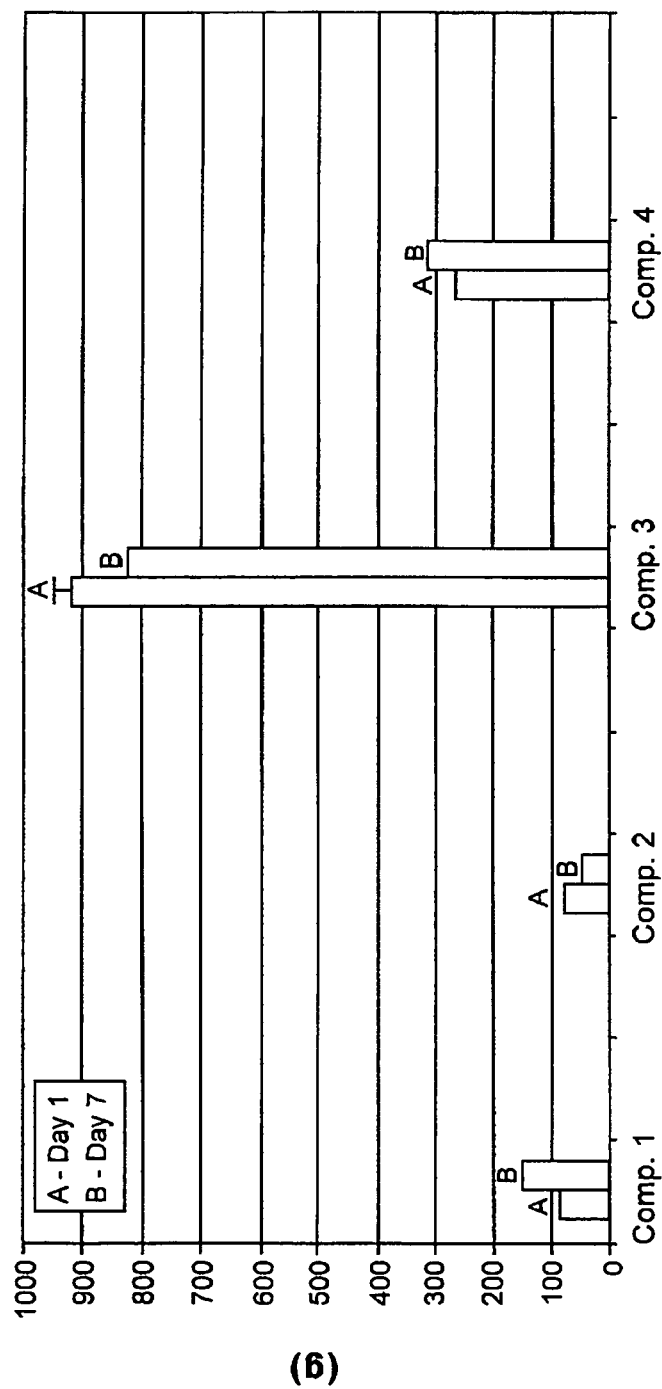
FIG. 11 is a graph comparing gel strength in process cheese systems.

As can be seen in FIG. 10, Composition 1 (comprising citrus pulp fiber) demonstrated viscosities of 524 cP, 590 cP, and 733 cP at 80° C., 75° C., and 70° C., respectively. However, the cheese was too liquid to be wrapped in a triangular foil, and it could not be turned out from its mold. Similarly, Composition 2 (comprising a blend of LBG/xanthan gum) demonstrated viscosities of 205.8 cP, 214 cP, and 258.3 cP at 80° C., 75° C., and 70° C., respectively. Likewise, the cheese was too liquid to be wrapped in a triangular foil, and it could not be turned out from its mold. Moreover, Composition 4 (comprising modified food starch and a blend of LBG/xanthan gum) demonstrated viscosities of 637.7 cP, 723.2 cP, and 848.7 cP at 80° C., 75° C., and 70° C., respectively. Composition 4 also was too liquid to be wrapped in a triangular foil, and it could not be turned out from its mold. While Compositions 1, 2, and 4 demonstrated acceptable spreadability, Composition 4 tasted very bad.

However, Composition 3 (comprising citrus pulp fiber and a blend of LBG/xanthan gum) demonstrated viscosities of 1503 cP, 1557 cP, and 1781 cP at 80° C., 75° C., and 70° C., respectively. The cheese was firm, could be turned out from its mold, and could be wrapped in a triangular foil. Composition 3 also demonstrated good spreadability, as indicated in FIG. 9, and also tasted good.

Thus, it can be seen that a process cheese system comprising at least one hydrocolloid (such as LBG, xanthan gum, and mixtures thereof) and citrus pulp fiber provides better functionalities than process cheese systems comprising hydrocolloid or citrus pulp fiber alone, indicating that citrus pulp fiber acts synergistically with at least one hydrocolloid to improve viscosity, firmness and spreadability.

Example 8

Fruit Application Systems

In this example, there are described fruit application systems, such as jam, preserve, and compote systems. Eight fruit compote systems were prepared using known methods (each example was incorporated into a red fruit and an apricot compote), and used various dry blend systems comprising the dry ingredients as described in Table 10 and 11 below. The citrus pulp fiber blend was from the CitriFi™ line, available from Fiberstar, Inc. of Willmar, Minn.

TABLE 10

| Ingredients (g) | Comp. 1 | Comp. 2 | Comp. 3 | Comp. 4 |
|---|---|---|---|---|
| Apple fiber | 0 | 10 | 0 | 0 |
| Citrus Pulp Fiber Blend | 0 | 0 | 2.25 | 9.9 |
| Pectin | 0 | 0 | 2.25 | 0.1 |
| Citric acid | 1 | 1 | 1 | 1 |
| Sucrose | 10 | 10 | 10 | 10 |
| Distilled water | 60 | 60 | 60 | 60 |
| Apricot pulp | 450 | 450 | 450 | 450 |
| Sucrose | 20 | 20 | 20 | 20 |
| Potassium sorbate | 0.3 | 0.3 | 0.3 | 0.3 |

TABLE 11

| Ingredients (g) | Comp. 5 | Comp. 6 | Comp. 7 | Comp. 8 |
|---|---|---|---|---|
| Apple fiber | 0 | 10 | 0 | 0 |
| Citrus Pulp Fiber Blend | 0 | 0 | 2.25 | 9.9 |
| Pectin | 0 | 0 | 2.25 | 0.1 |
| Citric acid | 1 | 1 | 1 | 1 |
| Sucrose | 10 | 10 | 10 | 10 |
| Distilled water | 60 | 60 | 60 | 60 |
| Red fruit pulp | 450 | 450 | 450 | 450 |
| Sucrose | 20 | 20 | 20 | 20 |
| Potassium sorbate | 0.3 | 0.3 | 0.3 | 0.3 |

When subjected to visual evaluation for syneresis control, Compositions 1 and 5 demonstrated the most syneresis in both the red fruit and apricot fruit compotes, followed by Compositions 2 and 6. However, Compositions 3, 4, 7, and 8 demonstrated little to no syneresis in both fruit compotes.

Moreover, as can be seen in FIG. 12, the viscosity of each Composition was measured using a Haake VT550 viscometric analyzer. It is evident from FIG. 12 that Composition 7 demonstrated the thickest viscosity at almost 375 cp for the red fruit compote, and Composition 3 demonstrated over 150 cp for the apricot fruit compote, as compared to Compositions 1, 2, 5, and 6, which all demonstrated less than 50 cp for either fruit compote. Furthermore, Composition 8 demonstrated over 50 cp for the red fruit compote, as compared to Compositions 5 and 6.

Thus, it can be seen that a fruit compote system comprising at least one hydrocolloid, such as pectin, and citrus pulp fiber provides better functionality than fruit compote systems comprising no citrus pulp fiber or apple fiber, indicating that citrus pulp fiber acts synergistically with at least one hydrocolloid to improve syneresis control.

Example 9

Convenience Systems

In this example, there are described convenience systems, such as dressings, salsa, ketchup, and tomato sauce systems. For oil dressing systems, five 30% oil dressing systems were made using known methods, and comprised various dry blend systems comprising the dry ingredients as described in Table 12 below.

TABLE 12

| Ingredients (wt. %) | Comp. 1 | Comp. 2 | Comp. 3 | Comp. 4 | Comp. 5 |
|---|---|---|---|---|---|
| Sugar | 3.0 | 3.0 | 3.0 | 3.0 | 3.0 |
| Salt | 2.0 | 2.0 | 2.0 | 2.0 | 2.0 |
| Potassium Sorbate | 0.12 | 0.12 | 0.12 | 0.12 | 0.12 |
| Water | 50.38 | 50.38 | 50.38 | 50.38 | 51.88 |
| Instant Starch | 4.5 | 4.5 | 4.5 | 4.5 | 4.5 |
| CPF from Valencia oranges | 0.0 | 1.5 | 0.0 | 0.0 | 0.0 |
| CPF from E/M oranges | 1.5 | 0.0 | 0.0 | 0.0 | 1.5 |
| CitriFi 100 M40 | 0.0 | 0.0 | 0.0 | 1.5 | 0.0 |
| CitriFi 100 FG | 0.0 | 0.0 | 1.5 | 0.0 | 0.0 |
| Egg Yolk Powder | 1.5 | 1.5 | 1.5 | 1.5 | 0.0 |
| Guar gum/Xanthan gum (2:3) | 0.0 | 0.0 | 0.0 | 0.0 | 0.0 |
| Sunflower Oil | 30 | 30 | 30 | 30 | 30 |
| Vinegar | 0.0 | 0.0 | 0.0 | 0.0 | 0.0 |
| Mustard | 2.0 | 2.0 | 2.0 | 2.0 | 2.0 |

As can be seen in FIG. 13, Composition 5 (comprising citrus pulp fiber and starch but no egg proteins) demonstrated an acceptable viscosity that is comparable to Composition 1 (comprising citrus pulp fiber, starch, and egg proteins). In fact, Composition 5 demonstrated thicker viscosities than Compositions 2, 3, and 4 (which all comprised citrus pulp fiber, starch, and egg proteins.) Thus, it can be seen that an oil dressing system comprising at least one starch and citrus pulp fiber provides comparable, if not better, functionality than oil dressing systems comprising citrus pulp fiber, starch, and protein, indicating that citrus pulp fiber acts synergistically with at least one starch to improve emulsion functionality. Accordingly, it can be seen that citrus pulp fibers can be used to reduce the protein solids content in an oil dressing system (and, in turn, the solids content) while retaining emulsion functionality.

Additionally, a salsa system was made using known methods, and comprised various dry blend systems comprising the dry ingredients as described in Table 13 below.

TABLE 13

| Ingredients (wt. %) | Comp. 1 | Comp. 2 | Comp. 3 | Comp. 4 | Comp. 5 |
|---|---|---|---|---|---|
| Tomato | 50.0 | 50.0 | 50.0 | 50.0 | 50.0 |
| Tomato Paste | 10.0 | 10.0 | 10.0 | 10.0 | 10.0 |
| Modified Starch | 3.0 | 0.0 | 0.0 | 0.0 | 0.0 |
| Native Starch A | 0.0 | 0.5 | 0.5 | 0.5 | 0.5 |
| Native Starch B | 0.0 | 1.5 | 1.5 | 1.5 | 1.5 |
| CPF from Valencia oranges | 0.0 | 0.0 | 0.5 | 0.0 | 0.0 |
| CPF from E/M oranges | 0.0 | 0.5 | 0.0 | 0.0 | 0.0 |
| CitriFi 100 M40 | 0.0 | 0.0 | 0.0 | 0.5 | 0.0 |
| CitriFi 100 FG | 0.0 | 0.0 | 0.0 | 0.0 | 0.5 |
| Green Peppers | 10.0 | 10.0 | 10.0 | 10.0 | 10.0 |
| Vinegar | 2.0 | 2.0 | 2.0 | 2.0 | 2.0 |
| Salt | 2.0 | 2.0 | 2.0 | 2.0 | 2.0 |
| Sugar | 1.0 | 1.0 | 1.0 | 1.0 | 1.0 |
| Garlic Powder | 0.20 | 0.20 | 0.20 | 0.20 | 0.20 |
| Water | 21.8 | 22.3 | 22.3 | 22.3 | 22.3 |

Procedure: All ingredients were mixed in a jacketed kettle and heated to 95° C. Thereafter, the mix was cooled down to produce a finished salsa system.

Figure 14:
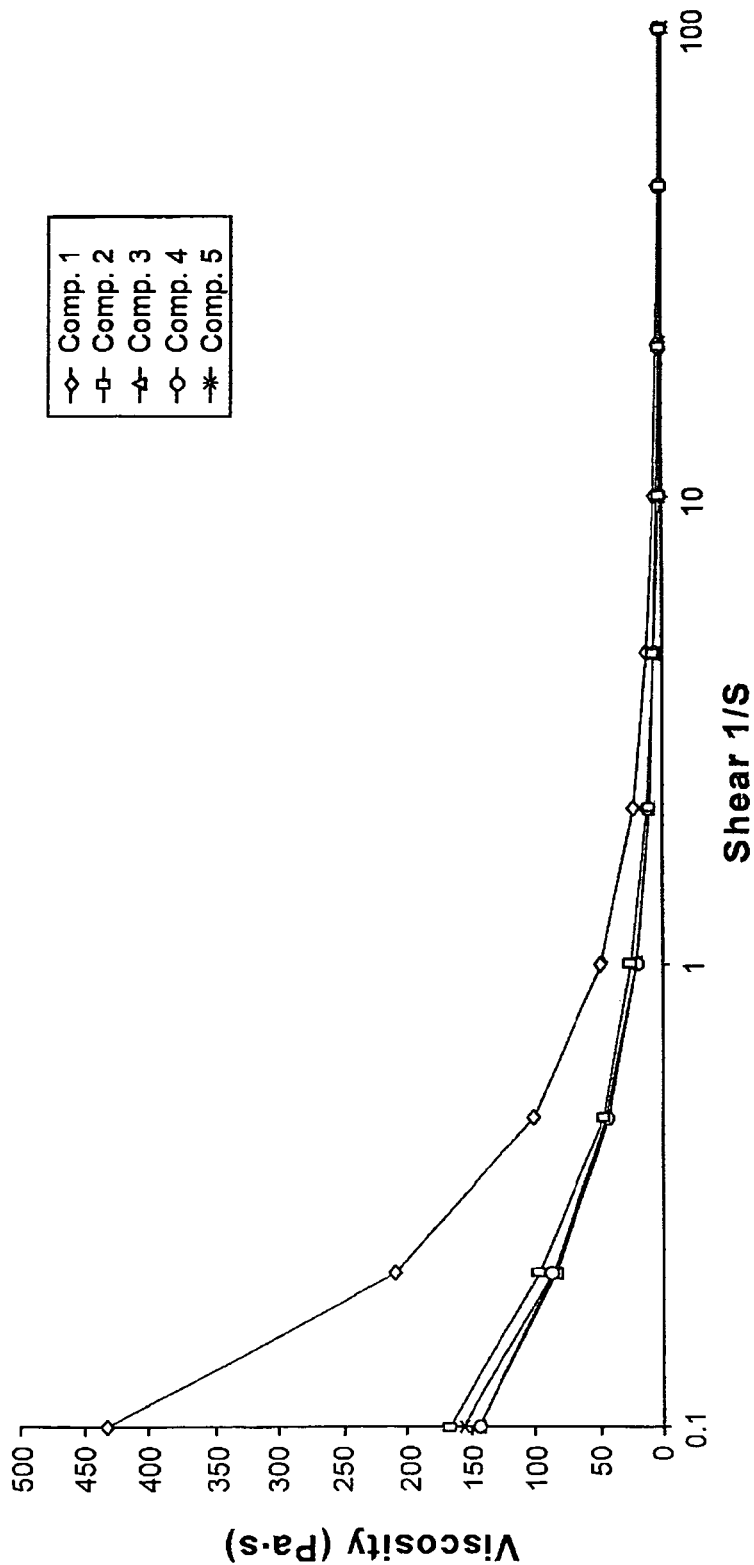
FIG. 14 is a graph comparing viscosities in convenience salsa systems.

As can be seen in FIG. 14, all compositions demonstrated acceptable viscosities. Moreover, Compositions 2 through 5 comprised only 2 wt. % native starch, as compared to 3 wt. % modified starch in Composition 1. Thus, it can be seen that a salsa system comprising native starches and citrus pulp fiber provides acceptable functionality, similar to salsa systems comprising modified starches, indicating that citrus pulp fiber acts synergistically with native starches to stabilize the salsa system. Accordingly, it can also be seen that citrus pulp fibers can be used to reduce the carbohydrate solids content in a salsa system (and, in turn, the solids content) while stabilizing the salsa system.

A ketchup system was also made using known methods, and comprised various dry blend systems comprising the dry ingredients as described in Table 14 below.

TABLE 14

| Ingredients (wt. %) | Comp. 1 | Comp. 2 | Comp. 3 | Comp. 4 | Comp. 5 |
|---|---|---|---|---|---|
| Tomato Paste | 30.0 | 30.0 | 30.0 | 30.0 | 30.0 |
| Modified Starch | 2.0 | 0.0 | 0.0 | 0.0 | 0.0 |
| Native Starch | 0.0 | 1.5 | 1.5 | 1.5 | 1.5 |
| CPF from Valencia oranges | 0.0 | 0.0 | 1.0 | 0.0 | 0.0 |
| CPF from E/M oranges | 0.0 | 1.0 | 0.0 | 0.0 | 0.0 |
| CitriFi 100 M40 | 0.0 | 0.0 | 0.0 | 1.0 | 0.0 |
| CitriFi 100 FG | 0.0 | 0.0 | 0.0 | 0.0 | 1.0 |
| Vinegar | 5.0 | 5.0 | 5.0 | 5.0 | 5.0 |
| Salt | 1.0 | 1.0 | 1.0 | 1.0 | 1.0 |
| Sugar | 18.5 | 18.5 | 18.5 | 18.5 | 18.5 |
| Citric acid (anhydrous) | 0.30 | 0.30 | 0.30 | 0.30 | 0.30 |
| Water | 43.2 | 42.7 | 42.7 | 42.7 | 42.7 |

Procedure: All dry ingredients were mixed into the water phase. The mix was then heated to about 90° C.-92° C., held at that temperature for 3 minutes, and filled into containers.

Figure 15:
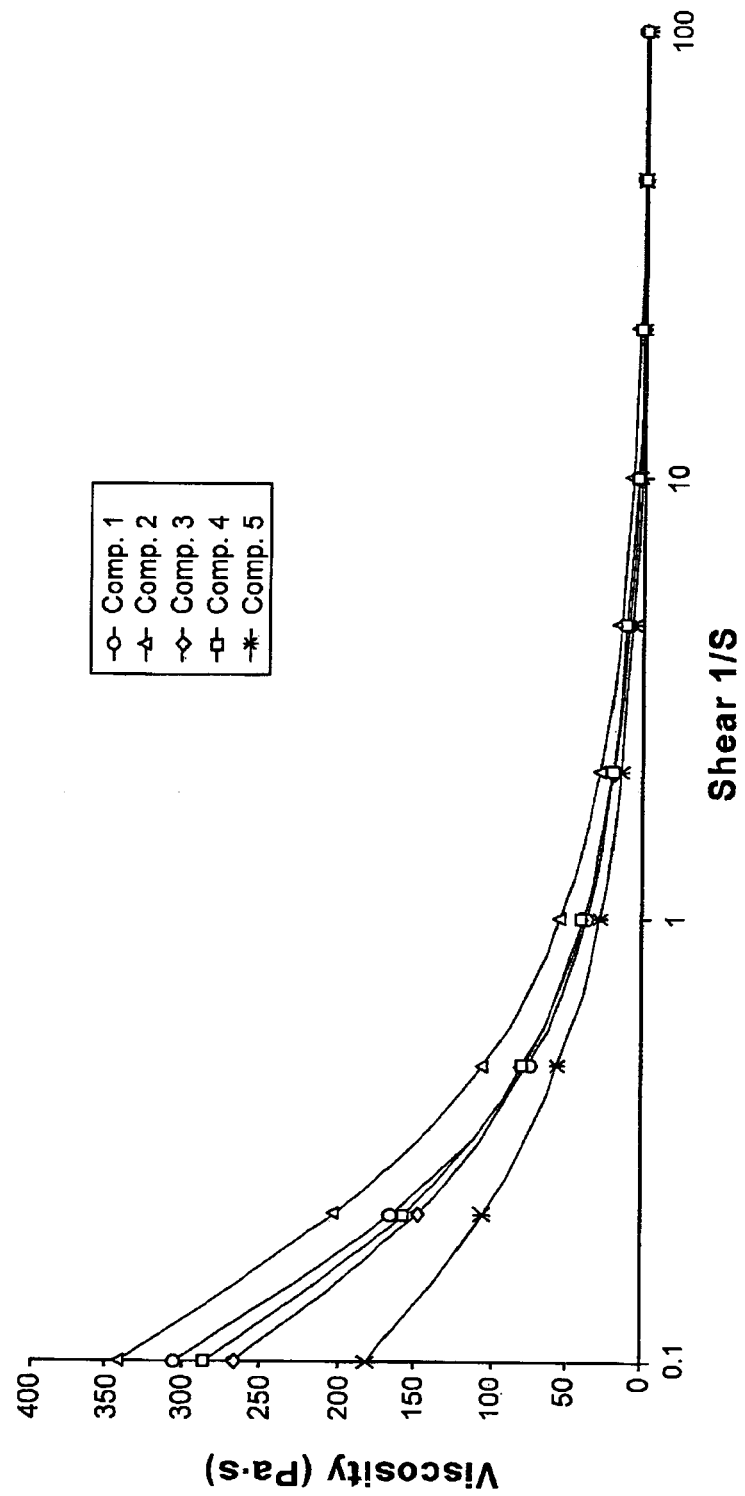
FIG. 15 is a graph comparing viscosities in convenience ketchup systems.

The viscosities of Compositions 1-5 were noted at 20° C. and compared, as shown in FIG. 15. As can be seen in FIG. 15, Compositions 1-5 demonstrated acceptable viscosities. However, Compositions 2 through 5 comprised only 1.5 wt. % native starch, as compared to 2 wt. % modified starch in Composition 1. Furthermore, Composition 2 (comprising no modified starch) demonstrated the highest viscosity, even compared to Composition 1 (comprising modified starch).

Thus, it can be seen that a ketchup system comprising native starches and citrus pulp fiber provides acceptable functionality, similar to ketchup systems comprising modified starches, indicating that citrus pulp fiber acts synergistically with native starches to stabilize the ketchup system. Accordingly, it can also be seen that citrus pulp fibers can be used to reduce the carbohydrate solids content in a ketchup system (and, in turn, the solids content) while stabilizing the ketchup system.

Example 10

Beverage Systems

In this example, there are described beverage systems. Seven beverage systems were formed using various dry blend systems comprising the dry ingredients as described in Table 15 below. The base blend comprised carboxymethyl cellulose, guar gum, xanthan gum, and pectin.

TABLE 15

| Ingredients (wt. %) | Comp. 1 | Comp. 2 | Comp. 3 | Comp. 4 | Comp. 5 | Comp. 6 | Comp. 7 |
|---|---|---|---|---|---|---|---|
| Water | 51.58 | 50.97 | 50.70 | 50.97 | 50.70 | 51.10 | 50.70 |
| Sugar | 8.00 | 8.00 | 8.00 | 8.00 | 8.00 | 8.00 | 8.00 |
| Natural pineapple juice | 40.0 | 40.0 | 40.0 | 40.0 | 40.0 | 40.0 | 40.0 |
| Citric acid | 0.30 | 0.30 | 0.30 | 0.30 | 0.30 | 0.30 | 0.30 |
| Pectin | 0.00 | 0.20 | 0.20 | 0.20 | 0.20 | 0.20 | 0.20 |
| CitriFi 100 | 0.00 | 0.53 | 0.70 | 0.00 | 0.00 | 0.30 | 0.35 |
| CitriFi 100 M40 | 0.00 | 0.00 | 0.00 | 0.53 | 0.70 | 0.00 | 0.35 |
| Base Blend | 0.12 | 0.00 | 0.00 | 0.00 | 0.00 | 0.00 | 0.00 |

Procedure: A first solution was formed by dissolving a dry blend system comprising pectin, sugar, and citrus pulp fiber in 500 mL of water at 75-80° C. A second solution of citric acid, sugar, and juice was formed in 800 mL of water. The first and second solutions were then mixed together, heated to 70° C., homogenized at 2000 psi, pasteurized at 90° C., and filled into bottles. The bottles were then closed and placed in an ice bath to produce a vacuum effect. Thereafter, the bottles were evaluated for phase separation and pulp suspension. The texture and viscosity at 25° C. of each example was also noted.

Upon visual evaluation for phase separation and pulp suspension, Composition 1 demonstrated good suspension, no phase separation, viscosity of 95 cps, and a light texture.

Similarly, Composition 2 demonstrated acceptable suspension, a little phase separation, viscosity of 110 cps, and excellent body (more pulp sensation). Composition 3 also demonstrated acceptable suspension, a little phase separation, viscosity of 240 cps, and excellent body (more pulp sensation). However, Composition 4 demonstrated bad suspension, phase separation, viscosity of 62.5 cps, and excellent body (more pulp sensation). Similarly, Composition 5 also demonstrated bad suspension, phase separation, viscosity of 85 cps, and excellent body (more pulp sensation). Composition 6 also demonstrated bad suspension, phase separation, viscosity of 42.5 cps, and excellent body (more pulp sensation). Composition 7 likewise demonstrated bad suspension, phase separation, viscosity of 75 cps, and excellent body (more pulp sensation).

Thus, the results suggest that citrus pulp fibers can act synergistically with pectin to impart suspension properties in pulp based beverages, as seen in Compositions 2 and 3. Accordingly, beverage systems can be made using only naturally-sourced ingredients, while maintaining desirable suspension properties, because only natural ingredients are used to replace synthetic carbohydrates, such as carboxymethyl cellulose, or other ingredients prohibited under certain regulations around the world, such as guar gum and xanthan gum.

At numerous places throughout this specification, reference has been made to a number of U.S. patents, published foreign patent applications and published technical papers. All such cited documents are expressly incorporated in full into this disclosure as if fully set forth herein.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a protein" includes two or more different proteins. As used herein, the term "include" and its grammatical variants are intended to be non-limiting, such that recitation of items in a list is not to the exclusion of other like items that can be substituted or added to the listed items.

It is also noted that the headings as used in this specification are purely for organizational purposes and are intended to be non-limiting, such that recitation of items under a heading is not to the exclusion of other like items that can be substituted or added to the items discussed therein.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

Applicants do not intend to dedicate any disclosed embodiments to the public, and to the extent any disclosed modifications or alterations may not literally fall within the scope of the claims, they are considered to be part of the invention under the doctrine of equivalents.

What is claimed is:

1. A dry blend system comprising:
   citrus pulp fiber having a water binding capacity of from about 7 g of water to about 25 g of water per gram of citrus pulp fiber, and an oil binding capacity of from about 1.5 g of oil to about 10 g of oil per gram of citrus pulp fiber; and
   n-octenyl succinate (nOSA) starch.

2. The dry blend system of claim 1 in a food product as a dairy protein replacement.

3. The dry blend system of claim 1 in a food product as a carbohydrates replacement.

4. The dry blend system of claim 1 in a food product as a lipid replacement.

5. The dry blend system of claim 1 in a food product as an emulsifier replacement.

6. A method of emulsifying a food system, said method comprising:
   providing a dry blend system according to claim 1; and
   mixing said dry blend system with a liquid system to generate an emulsion,
   wherein the liquid system is selected from the group consisting of water, water miscible liquids, water immiscible liquids, and microemulsions; and wherein said emulsion is devoid of synthetic and natural emulsifiers.

7. The method of claim 6, wherein the synthetic and natural emulsifiers are selected from the group consisting of sodium stearoyl lactylate, monoglycerides, diglycerides, polysorbates, propylene glycol monoesters, lecithin, and mixtures thereof.

8. A method of minimizing phase separation in an emulsion, said method comprising:
   providing a dry blend system according to claim 1; and
   mixing said dry blend system with a liquid system to generate an emulsion, wherein the liquid system is selected from the group consisting of water, water miscible liquids, water immiscible liquids, and microemulsions; and wherein said emulsion is devoid of synthetic and natural emulsifiers.

9. The method of claim 8, wherein the natural and synthetic emulsifiers are selected from the group consisting of sodium stearoyl lactylate, monoglycerides, diglycerides, polysorbates, propylene glycol monoesters, lecithin, and mixtures thereof.

10. A method of controlling syneresis in a food system, said method comprising:
    providing a dry blend system according to claim 1; and
    mixing said dry blend system with a liquid system to generate a food system,
    wherein the liquid system is selected from the group consisting of water, water miscible liquids, water immiscible liquids, and microemulsions; and
    wherein said food system demonstrates reduced syneresis as compared to a food system devoid of citrus pulp fiber.

11. The method of claim 10, wherein the dry blend system is devoid of gelatins.

12. A method of providing high shear tolerance to a food system, said method comprising:
    providing a dry blend system according to claim 1; and
    mixing said dry blend system with a liquid system to generate a food system,
    wherein the liquid system is selected from the group consisting of water, water miscible liquids, water immiscible liquids, and microemulsions; and wherein said food system demonstrates high shear tolerance as compared to a food system devoid of citrus pulp fiber.

\* \* \* \* \*